US006986137B1

(12) United States Patent
King et al.

(10) Patent No.: US 6,986,137 B1
(45) Date of Patent: Jan. 10, 2006

(54) METHOD, SYSTEM AND PROGRAM PRODUCTS FOR MANAGING LOGICAL PROCESSORS OF A COMPUTING ENVIRONMENT

(75) Inventors: Gary M. King, Millbrook, NY (US); Jeffrey P. Kubala, Poughquag, NY (US); Jeffrey M. Nick, West Park, NY (US); Peter B. Yocom, Lagrangeville, NY (US)

(73) Assignee: International Business Machines Corporation, Armonkn, NY (US)

( * ) Notice: Subject to any disclaimer, the term of this patent is extended or adjusted under 35 U.S.C. 154(b) by 0 days.

(21) Appl. No.: 09/407,594

(22) Filed: Sep. 28, 1999

(51) Int. Cl.
*G06F 9/46* (2006.01)

(52) U.S. Cl. .................... 718/104; 718/100; 718/102; 718/105; 711/173; 709/226; 709/220; 709/221

(58) Field of Classification Search ............... 709/100, 709/102, 104, 226, 220, 221; 711/173, 209; 718/100, 102, 104; 713/100
See application file for complete search history.

(56) References Cited

U.S. PATENT DOCUMENTS

| | | | |
|---|---|---|---|
| 4,564,903 A | 1/1986 | Guyette et al. ............. 364/300 |
| 4,843,541 A | 6/1989 | Bean et al. ................. 365/200 |
| 5,168,554 A * | 12/1992 | Luke .......................... 715/509 |
| 5,220,654 A | 6/1993 | Benson et al. .............. 395/275 |
| 5,257,368 A | 10/1993 | Benson et al. .............. 396/600 |
| 5,257,379 A | 10/1993 | Cwiakala et al. ........... 395/700 |
| 5,301,323 A | 4/1994 | Maeurer et al. ............ 395/650 |
| 5,317,739 A | 5/1994 | Elko et al. .................. 395/650 |
| 5,473,773 A | 12/1995 | Aman et al. ................ 396/650 |
| 5,526,484 A | 6/1996 | Casper et al. ........... 395/200.14 |
| 5,561,809 A | 10/1996 | Elko et al. ................... 395/800 |
| 5,564,040 A | 10/1996 | Kubala .................... 395/497.04 |
| 5,659,786 A * | 8/1997 | George et al. .............. 713/100 |
| 5,675,739 A | 10/1997 | Eilert et al. ............. 395/200.11 |
| 5,706,432 A | 1/1998 | Elko et al. ............. 395/200.08 |
| 5,881,284 A | 3/1999 | Kubo ......................... 395/675 |
| 6,260,068 B1 * | 7/2001 | Zalewski et al. ........... 709/226 |
| 6,453,344 B1 * | 9/2002 | Ellsworth et al. .......... 709/220 |

FOREIGN PATENT DOCUMENTS

| | | |
|---|---|---|
| JP | 06-103092 | 4/1994 |
| JP | 09-091257 | 4/1997 |
| JP | 11-065862 | 3/1999 |

OTHER PUBLICATIONS

Dussa et al. "Dynamic Partitioning in a Transputer Environment" Apr. 1990, ACM SIGMETRICS Performance Evaluation Review, Proceedings of the 1990 ACM SIGMETRICS conference in Measurement and modeling, vol. 18 issue 1.*

Yu et al. "Reliability Enhancement of Real-Time Multiprocessor Systems through Dynamic Reconfiguration", Jun. 1994, Fault-Tolerant Parrallel and Distributed Systems, Proceedings of IEEE Workshop, pp. 161-168.*

(Continued)

*Primary Examiner*—Anthony Knight
*Assistant Examiner*—Thomas Pham
(74) *Attorney, Agent, or Firm*—William A. Kinnaman, Esq.; Kevin P. Radigan, Esq.; Heslin Rothenberg Farley & Mesiti, P.C.

(57) ABSTRACT

The configuration of the logical processors of a logical partition is managed dynamically. A logical partition is initially configured with one or more logical processors. Thereafter, the configuration can be dynamically adjusted. This dynamic adjustment may be in response to workload of the logical partition.

6 Claims, 22 Drawing Sheets

OTHER PUBLICATIONS

"Genesys: Sun's Platform Vision for the Networked Data Center," Feb. 1999, Sun Microsystems, Inc., pp. 1-14.

"Sun Enterprose 10000 InterDomain Networks User Guide," file:///C/WINDOWS/TEMP/interdomain.html, 1994-1999 Sun Microsystems, Inc., pp. 1-10.

"Enhancements to I/O Priority Quencing," IBM Technical Disclosure Bulletin, J.L. Boyle, S.C. Kurtz, A.S. Meritt, W.C. Shepard and J.Z. Teng, vol. 36, No. 06A, Jun. 1993, pp. 485-487.

* cited by examiner

REMOVE FROM A GROUP

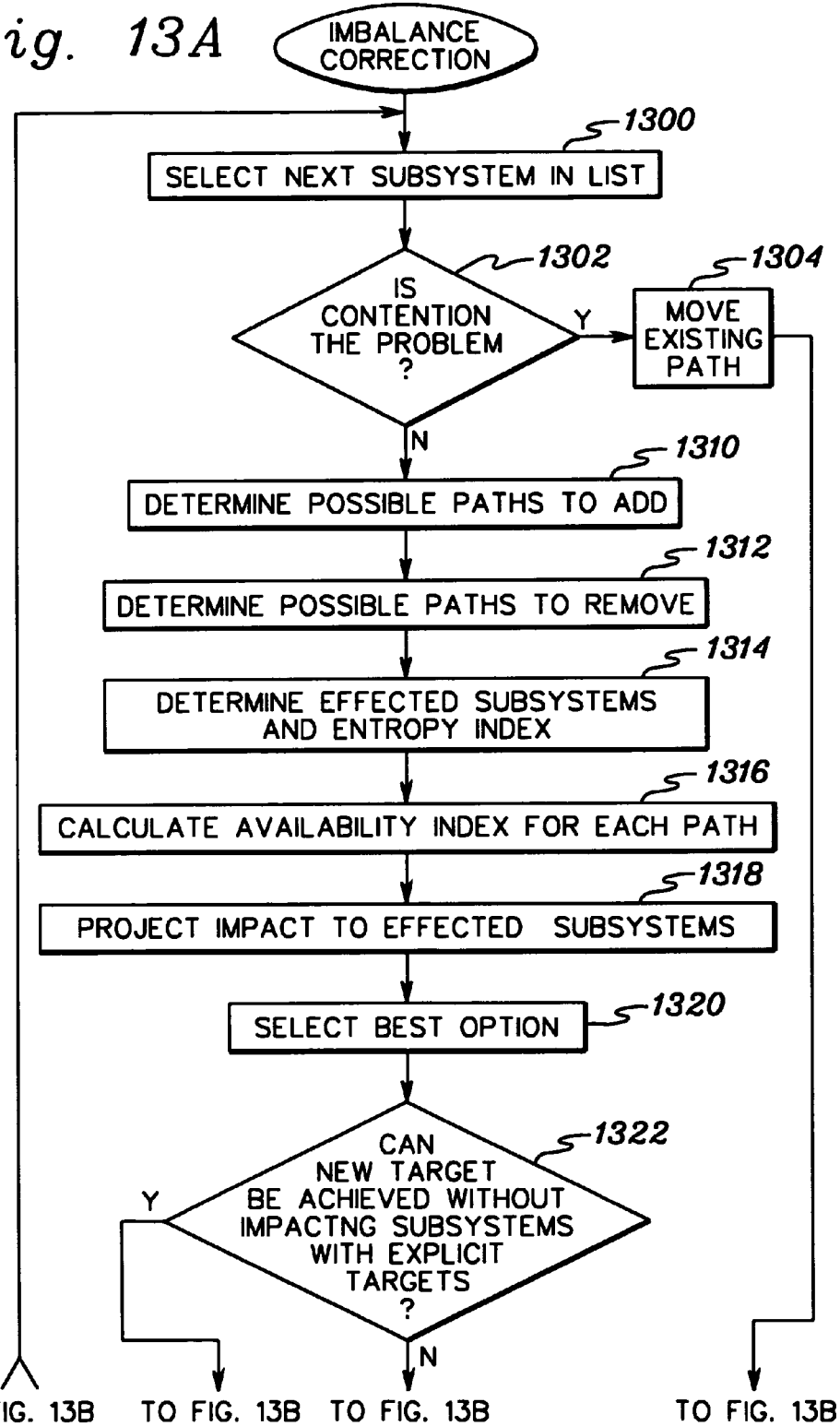

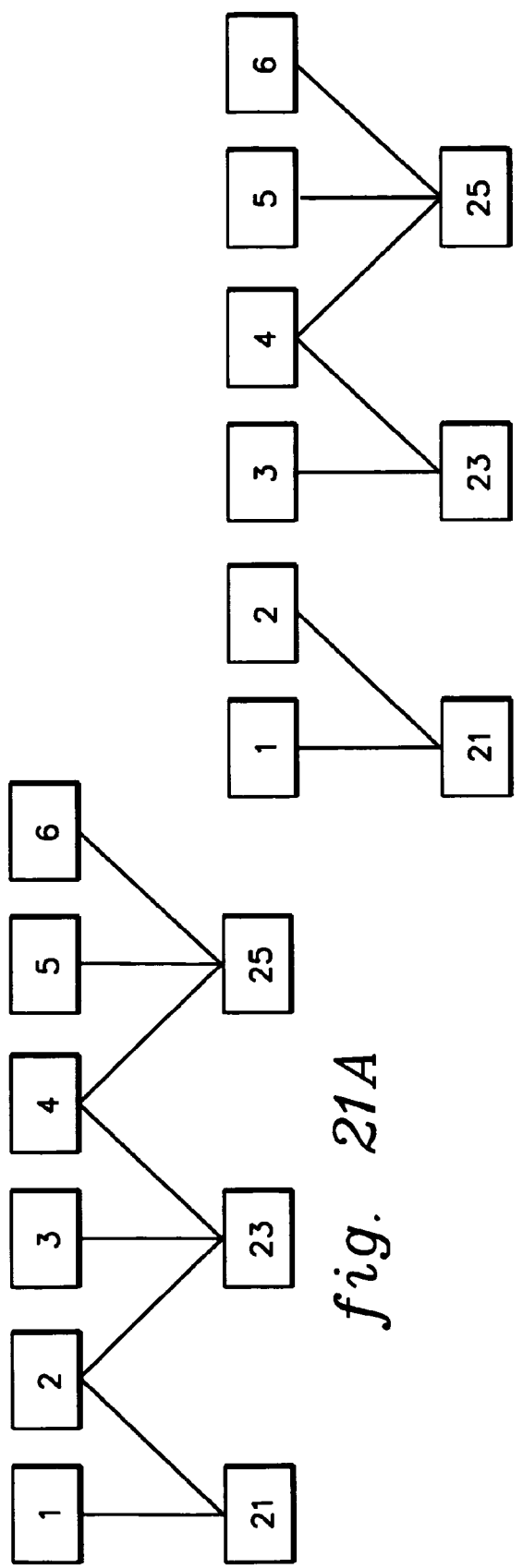
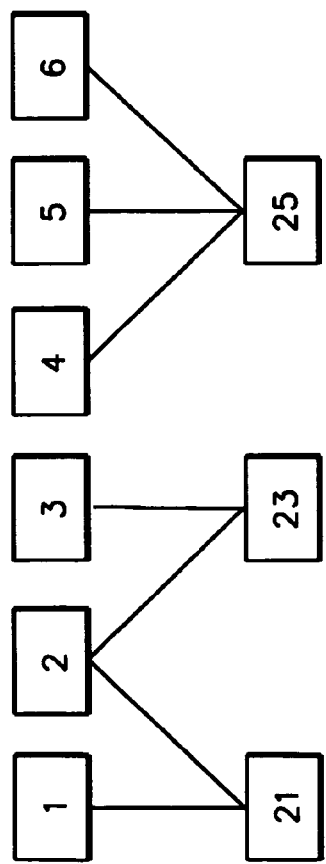
fig. 21A
fig. 21B
fig. 21C

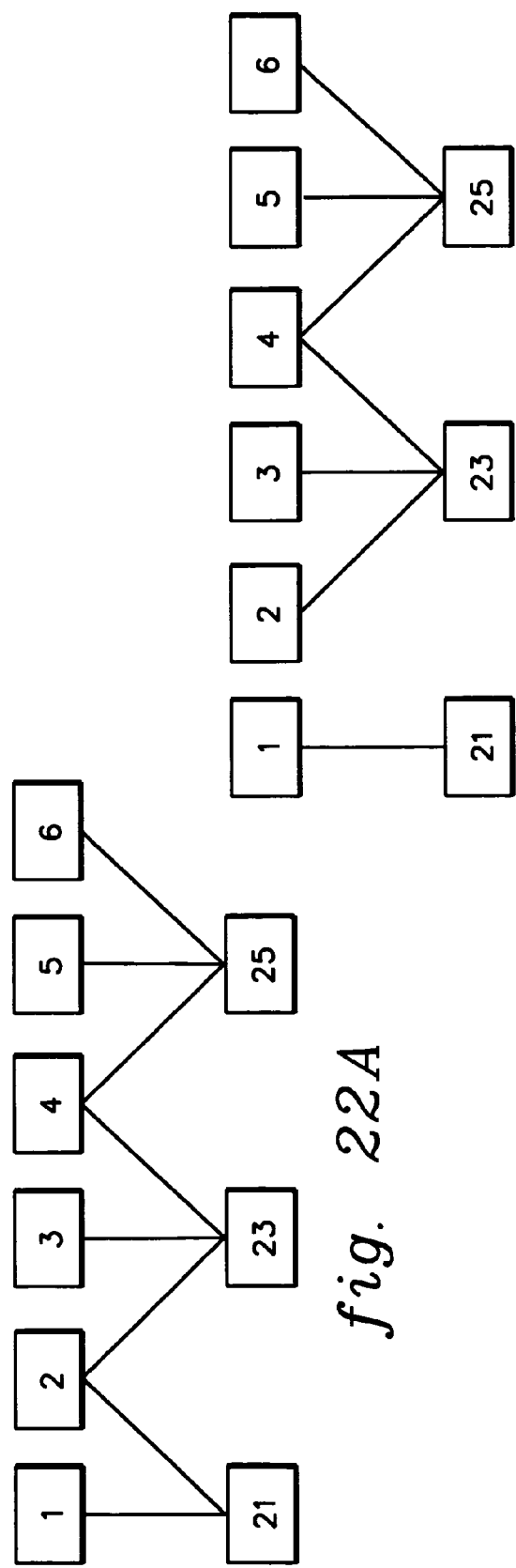
fig. 22A
fig. 22B
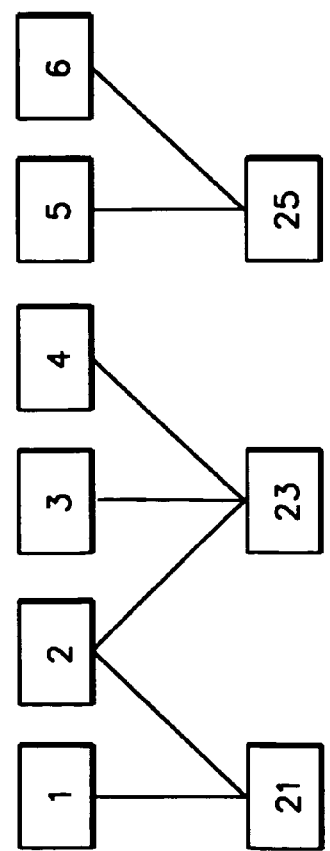
fig. 22C

METHOD, SYSTEM AND PROGRAM PRODUCTS FOR MANAGING LOGICAL PROCESSORS OF A COMPUTING ENVIRONMENT

CROSS-REFERENCE TO RELATED APPLICATIONS

This application contains subject matter which is related to the subject matter of the following applications, each of which is assigned to the same assignee as this application and filed on the same day as this application. Each of the below listed applications is hereby incorporated herein by reference in its entirety:

"Dynamically Redistributing Shareable Resources Of A Computing Environment To Manage The Workload Of That Environment," Kubala et al., Ser. No. 09/408,470, filed herewith;

"Method, System And Program Products For Managing Groups Of Partitions Of A Computing Environment," Kubala et al., Ser. No. 09/407,291, filed herewith;

"Method, System And Program Products For Managing Central Processing Unit Resources Of A Computing Environment," Eilert et al., Ser. No. 09/407,212, filed herewith; U.S. Pat. No. 6,587,938;

"Processing Channel Subsystem Pending I/O Work Queues Based On Priorities," Maergner et al., Ser. No. 09/407,459, filed herewith; U.S. Pat. No. 6,651,125.

"Method, System And Program Products For Managing I/O Configurations Of A Computing Environment," Cwiakala et al., Ser. No. 09/407,544, filed herewith;

"Method, System And Program Products For Determining I/O Configuration Entropy," William J. Rooney, Ser. No. 09/407,453, filed herewith; U.S. Pat. No. 6,519,660;

"Method And Apparatus For Assigning Resources To Logical Partition Clusters," Rooney et al., Ser. No. 09/407,810, filed herewith; U.S. Pat. No. 6,598,069; and "Method And Apparatus For Creating And Identifying Logical Partition Clusters," Rooney et al., Ser. No. 09/407,514, filed herewith; U.S. Pat. No. 6,567,841.

TECHNICAL FIELD

This invention relates, in general, to managing workload within a computing system, and, in particular, to managing workload in a partitioned system, such as a logically partitioned system.

BACKGROUND ART

Logical partitioning allows the establishment of a plurality of system images within a single physical machine or central processor complex (CPC). Each system image is capable of operating as if it was a separate computer system. That is, each logical partition can be independently reset, initially loaded with an operating system that may be different for each logical partition, and operate with different software programs using different input/output (I/O) devices.

Examples of logically partitioned computing systems are described in, for instance, Guyette et al., U.S. Pat. No. 4,564,903, entitled "Partitioned Multiprocessor Programming System", issued on Jan. 14, 1986; Bean et al., U.S. Pat. No. 4,843,541, entitled "Logical Resource Partitioning Of A Data Processing System", issued on Jun. 27, 1989; and Kubala, U.S. Pat. No. 5,564,040, entitled "Method And Apparatus For Providing A Server Function In A Logically Partitioned Hardware Machine", issued on Oct. 8, 1996, each of which is hereby incorporated herein by reference in its entirety.

Commercial embodiments of logically partitioned systems include, for example, IBM S/3901 processors with the Processor Resource/Systems Manager™ (PR/SM™) feature, which is described, for instance, in the IBM publication *Processor Resource/Systems Manager Planning Guide*, GA22-7236-04, March 1999, which is hereby incorporated herein by reference in its entirety.

One important aspect of a logically partitioned system is the management of workload running within the partitions of that system. In S/390 systems, for example, workload managers are used to manage the workload within and among the partitions. The workload managers attempt to balance the workload of the partitions by moving work to the physical resources of the system. In order to move the work, however, it is important to ensure that the data needed by the relocated work is at the moved location. This need often restricts the movement of work. Thus, although efforts have been made to balance workload within a logically partitioned system, further needs exist and further efforts are needed.

SUMMARY OF THE INVENTION

The shortcomings of the prior art are overcome and additional advantages are provided through the provision of a method of managing logical processors of a computing environment. The method includes, for instance, configuring a logical partition of the computing environment with one or more logical processors; and dynamically adjusting the configuration.

In one example, the dynamically adjusting is in response to workload of the logical partition.

In yet another example, the method further includes determining that the configuration is to be adjusted. In one example, the determining uses a predefined equation to make the determination.

System and computer program products corresponding to the above-summarized methods are also described and claimed herein.

Advantageously, at least one aspect of the present invention enables the dynamic adjustment of the configuration of logical processors of logical partitions of a computing environment. This allows the number of logical processors configured to a logical partition to remain close to the number of physical CPUs desired to provide the CPC capacity assigned to (or used by) a logical partition. Further, the number of logical processors to manage is minimized.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 13a–13b depict one embodiment of the logic associated with correcting an imbalance of a I/O configuration, in accordance with the principles of the present invention;

FIGS. 16a–22c depict various examples of I/O configurations used in determining entropy, in accordance with the principles of the present invention.

BEST MODE FOR CARRYING OUT THE INVENTION

Workload management capabilities are provided that enable the dynamic adjustment of the allocation of resources of a computing environment to balance the workload of that environment. In one example, the computing environment includes a plurality of logical partitions and the workload is managed across two or more of the partitions.

Figure 1A:
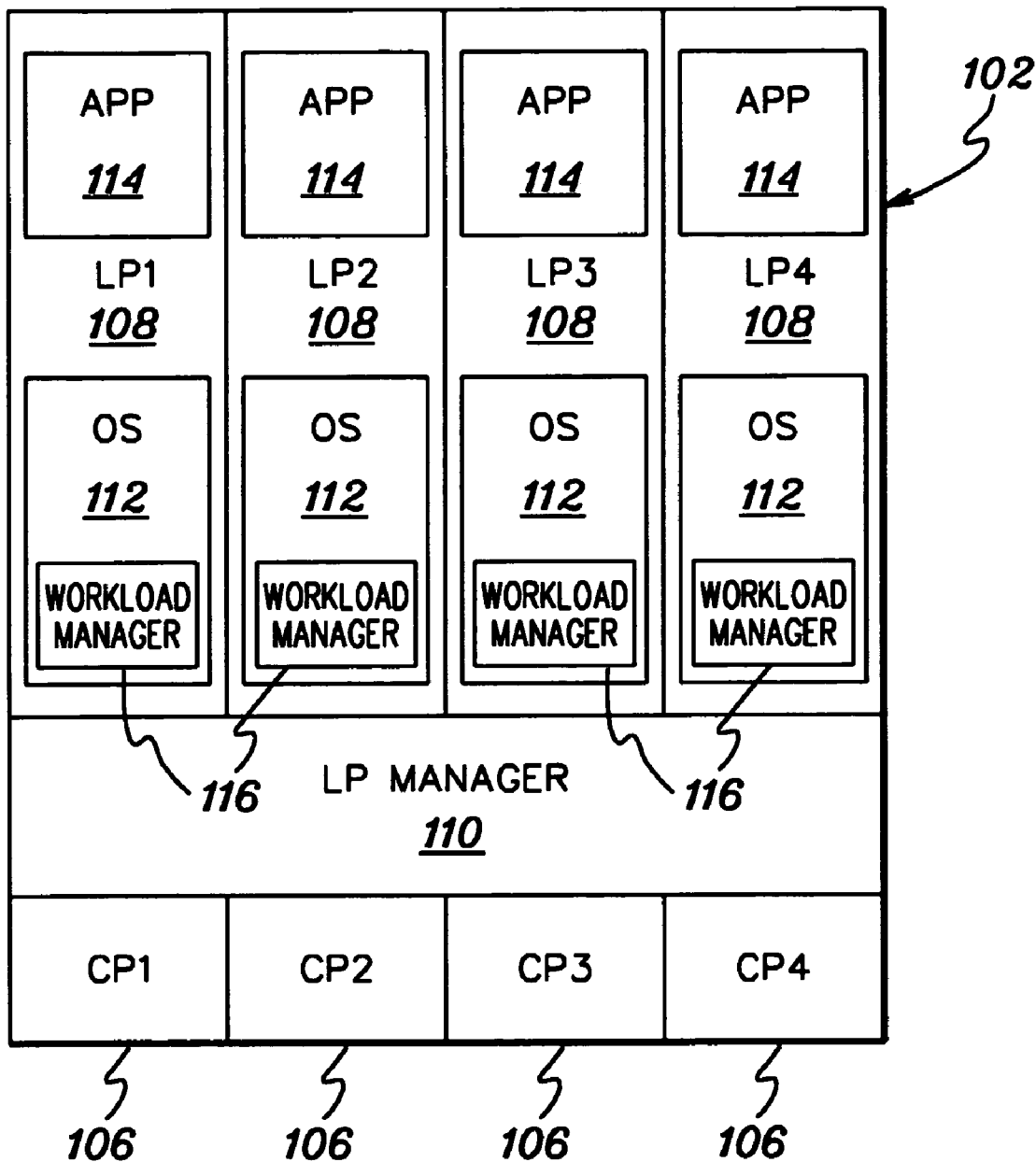
FIG. 1a depicts one example of a computing environment incorporating and using the capabilities of the present invention.

One embodiment of a computing environment incorporating and using the workload management capabilities of the present invention is described with reference to FIG. 1a. A computing environment 100 is based, for instance, on the Enterprise Systems Architecture (ESA)/390 offered by International Business Machines Corporation, Armonk, N.Y. ESA/390 is described in an IBM publication entitled "Enterprise Systems Architecture/390 Principles Of Operation," IBM Publication No. SA22-7201-04, June 1997, which is hereby incorporated herein by reference in its entirety. One example of a computing environment based on ESA/390 is the 9672 Parallel Enterprise Server offered by International Business Machines Corporation.

Computing environment 100 includes, for example, a central processor complex (CPC) 102 having one or more central processors 106 (e.g., CP1–CP4), one or more partitions 108 (e.g., logical partitions (LP1–LP4)), and at least one logical partition manager 110, each of which is described below.

Central processors 106 are physical processor resources that are allocated to the logical partitions. In particular, each logical partition 108 has one or more logical processors (not separately shown for clarity), each of which represents all or a share of a physical processor 106 allocated to the partition. The logical processors of a particular partition 108 may be either dedicated to the partition (so that the underlying processor resource 106 is reserved for that partition) or shared with another partition (so that the underlying processor resource is potentially available to another partition).

In the particular example shown, each of logical partitions LP1–LP4 functions as a separate system having a resident operating system 112 (which may differ for each logical partition) and one or more applications 114. In one embodiment, operating system 112 is the OS/390>or MVS/ESA™ operating system offered by International Business Machines Corporation.

Additionally, each operating system (or a subset thereof) includes a workload manager 116 for managing the workload within a partition and among partitions. One example of a workload manager is WLM offered by International Business Machines Coropration. WLM is described in, for instance, U.S. Pat. No. 5,473,773, Aman et al., entitled "Apparatus And Method For Managing A Data Processing System Workload According To Two Or More Distinct Processing Goals", issued Dec. 5, 1995; and U.S. Pat. No. 5,675,739, Eilert et al., entitled "Apparatus And Method For Managing A Distributed Data Processing System Workload According To A Plurality Of Distinct Processing Goal Types", issued Oct. 7, 1997, each of which is hereby incorporated herein by reference in its entirety.

Logical partitions 108 are managed by logical partition manager 110 implemented by microcode running on processors 106. Logical partitions 108 (LP1–LP4) and logical partition manager 110 each comprise one or more programs residing in respective portions of central storage associated with the central processors. One example of logical partition manager 110 is PR/SM.

Figure 1B:
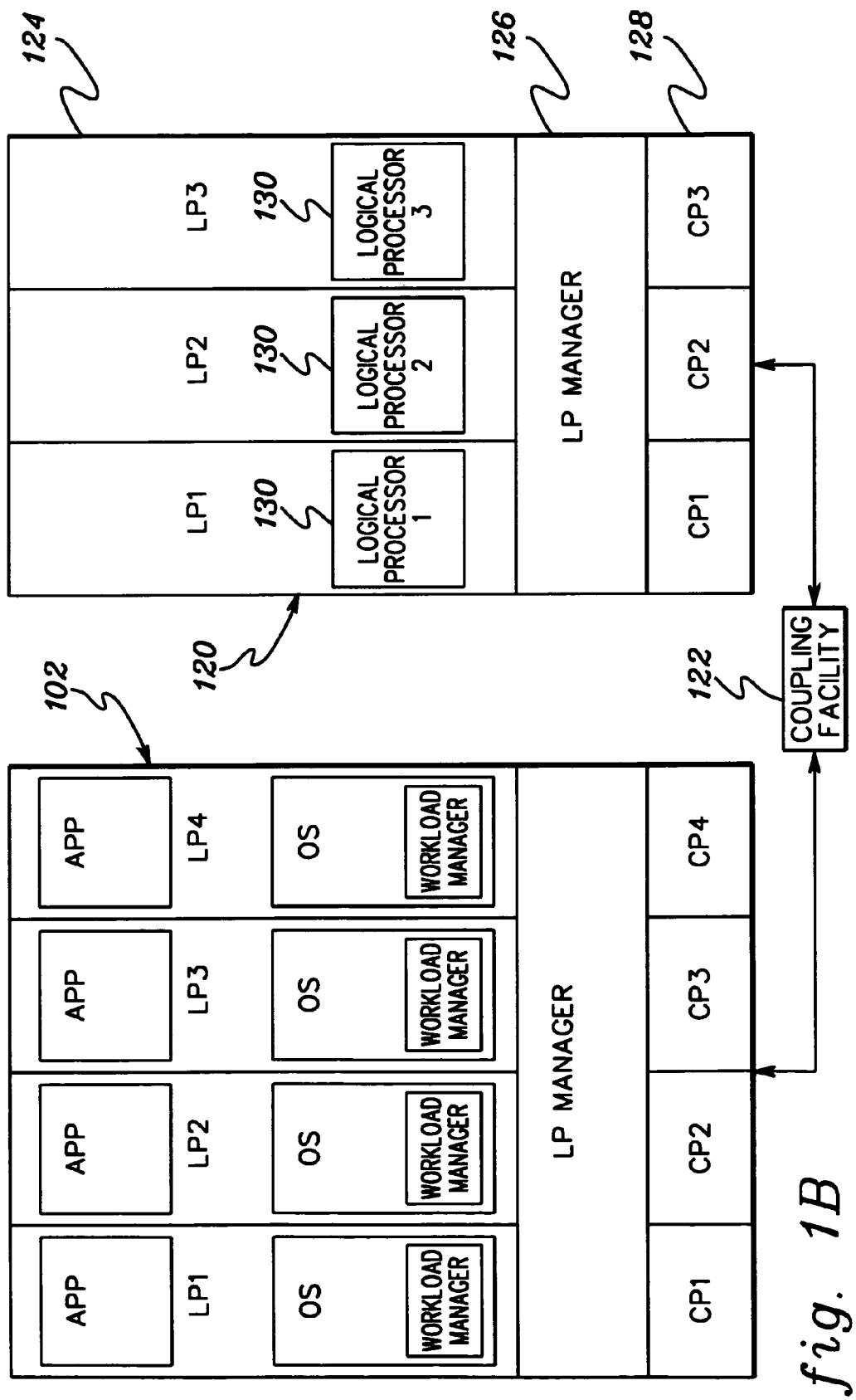
FIG. 1b depicts a further embodiment of a computing environment incorporating and using the capabilities of the present invention.

In a further embodiment of a computing environment, two or more central processor complexes are coupled to one another to form a sysplex, as depicted in FIG. 1b. As one example, a central processor complex (CPC) 102 is coupled to one or more other CPCs 120 via, for instance, a coupling facility 122.

In the example shown, CPC 120 includes a plurality of logical partitions 124 (e.g., LP1–LP3), which are managed by a logical partition manager 126. One or more of the logical partitions includes an operating system, which may have a workload manager and one or more application programs (not shown in this example for clarity). Additionally, CPC 120 includes a plurality of central processors 128 (e.g., CP1–CP3), the resources of which are allocated among the plurality of logical partitions. In particular, the resources are allocated among one or more logical processors 130 of each partition. (In other embodiments, each CPC may have one or more logical partitions and one or more central processors.)

Coupling facility 122 (a.k.a., a structured external storage (SES) processor) contains storage accessible by the central processor complexes and performs operations requested by programs in the CPCs. The coupling facility is used by various aspects of the present invention for the sharing of state information used in making shared resource redistribution decisions. (In one embodiment, each central processor complex is coupled to a plurality of coupling facilities.) Aspects of the operation of a coupling facility are described in detail in such references as Elko et al., U.S. Pat. No. 5,317,739 entitled "Method And Apparatus For Coupling Data Processing Systems", issued May 31, 1994; Elko et al., U.S. Pat. No. 5,561,809, entitled "In A Multiprocessing System Having A Coupling Facility Communicating Messages Between The Processors And The Coupling Facility In Either A Synchronous Operation Or An Asynchronous Operation", issued Oct. 1, 1996; Elko et al., U.S. Pat. No. 5,706,432, entitled "Mechanism For Receiving Messages At A Coupling Facility", issued Jan. 6, 1998; and the patents and applications referred to therein, all of which are hereby incorporated herein by reference in their entirety.

Figure 2:
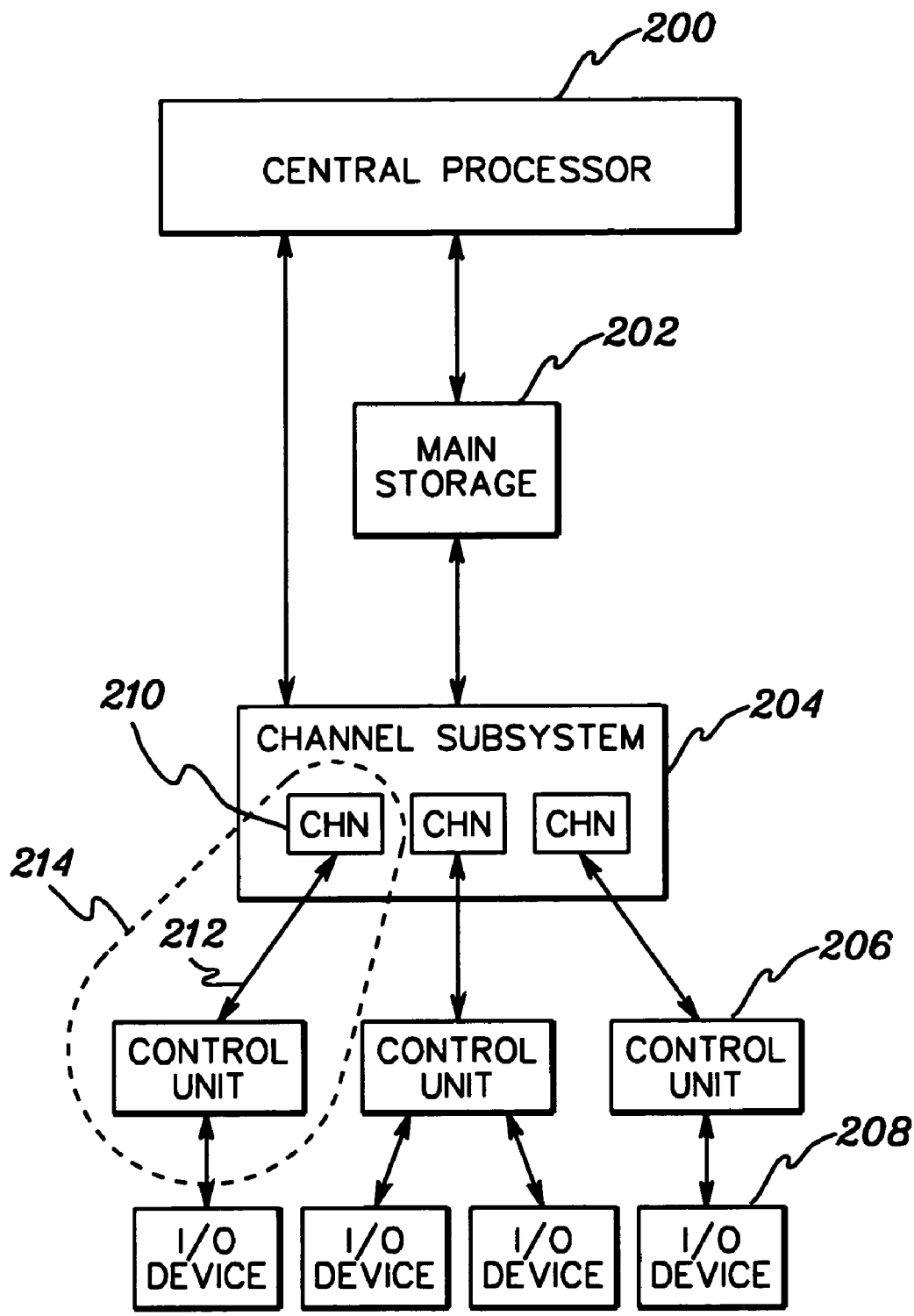
FIG. 2 depicts additional components of a computing environment incorporating and using the capabilities of the present invention.

In one embodiment, one or more of the central processors are coupled to at least one channel subsystem, which is used in communicating with I/O devices. For example, a central processor 200 (FIG. 2) is coupled to main storage 202 and at least one channel subsystem 204. Channel subsystem 204 is further coupled to one or more control units 206. The control units are then coupled to one or more I/O devices 208.

The channel subsystem directs the flow of information between the input/output devices and main storage. It relieves the central processing units of the task of communicating directly with the input/output devices and permits data processing to proceed concurrently with input/output processing. The channel subsystem uses one or more channel paths 214 as communication links in managing the flow of information to or from input/output devices 208.

Each channel path 214 includes, for instance, a channel 210 of channel subsystem 204, a control unit 206 and a link 212 between the channel and control unit. In other embodiments, a channel path may have multiple channels, control units, and/or links. Further, in another example, it is also possible to have one or more dynamic switches as part of the channel path. A dynamic switch is coupled to a channel and a control unit and provides the capability of physically interconnecting any two links that are attached to the switch. Further details regarding channel subsystems are described in Casper et al., U.S. Pat. No. 5,526,484, entitled "Method And System For Pipelining The Processing Of Channel Command Words," issued on Jun. 11, 1996, which is hereby incorporated herein by reference in its entirety.

In one aspect of the present invention, various physical resources are dynamically redistributed across the logical partitions of a computing environment under direction of one or more workload managers. This dynamic redistribution is transparent to the application subsystems.

As examples, the physical resources to be redistributed include CPU resources, logical processor resources, I/O resources, coprocessors, channel resources, network adapters, and memory resources. As one example, a coprocessor is a microprocessor (other than a CPU) within a CPC that serves a particular function. Examples of coprocessors include, for instance, channel subsystems, network adapter cards and cryptographic coprocessors. The above physical resources are only offered as examples. Other shareable resources may also be redistributed without departing from the spirit of the present invention.

In order to facilitate the dynamic redistribution of resources, in one embodiment, logical partitions are grouped together in order to share the resources among the partitions of the group. Each group can vary in size from 1 partition to n partitions. (In one example, one or more of the groups include one or more partitions, but less than all of the partitions of the computing environment.) In particular, each group includes, for instance, one or more operating system images running in independent domains of a machine, which are managed by a common workload manager function to distribute workloads and resources. In one example, these domains are logical partitions running in logically partitioned mode and the operating systems are OS/390 running in the logical partitions. The logical partitions of a group may be a subset of the partitions of a system (e.g., a CPC) or a sysplex, an entire system or sysplex, or may be partitions of different sysplexes (on, for example, a single CPC) or systems.

Figure 3:
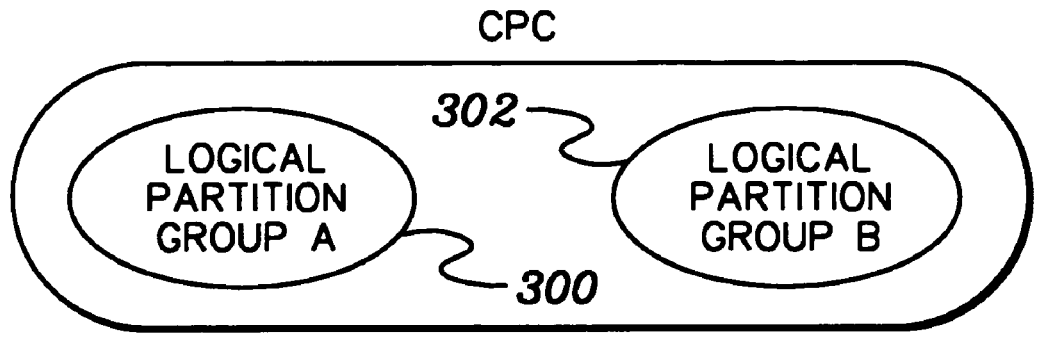
FIG. 3 depicts one example of logical partition groups used in accordance with the principles of the present invention.

One embodiment of two logical partition groups (or clusters) of a central processor complex is depicted in FIG. 3. As shown, there is a Logical Partition Group A 300 and a Logical Partition Group B 302, each of which includes one or more logical partitions. The grouping of logical partitions enables resource sharing among the partitions of a group through resource allocation (e.g., priority based resource allocation).

As examples, the resources to be shared include CPU resources, I/O resources, and memory, as well as co-processors or any other shareable resources the machine might provide. A particular logical partition group may or may not have access to all of the resources of a particular machine. In fact, multiple logical partition groups could be defined to operate concurrently on a single machine. In order to manage each logical partition group effectively, the resources that make up a particular logical partition group are effectively scoped to that group.

The scoping includes identifying which resources are allocatable to each group. In particular, the scope defines which resources are restricted to the group and can be managed for the group. The logical partitions that make up a logical partition group can be thought of as a container of the resources. These containers exist within the bounds of a total set of resources available to the logical partitions. In one example, this is the total set of resources available on a particular CPC.

The logical partitions that make up a particular logical partition group (e.g., Logical Partition Group A) are assigned a particular portion of the total shareable resource. For example, assume that the shareable resource is a CPU resource. With shared CPU resources, the logical partitions that are included in Logical Partition Group A are assigned a particular portion of the total central processor complex CPU resource. These resources are being shared by the logical partitions within a particular group, as well as, potentially, with logical partitions in other logical partition groups and logical partitions not included in any logical partition groups. Thus, a workload manager that is trying to make decisions about moving resources within a group (from, for instance, one partition in the logical partition group to another partition in the group) is to have an understanding of the resources that comprise the group, as well as an understanding of what the larger container (e.g., the CPC) contains. Measurement feedback (e.g., state information stored in the coupling facility) used to make decisions about managing workload resources are to be sufficient to understand the customer defined containers as above.

Once this understanding is established, workload manager directed changes to the resource allocations in the logical partitions of a given group are typically done in such a way that keeps the container size (i.e., the resources allocated to the logical partition group) constant. For instance, assume that the resource to be managed is the CPU resource, and further assume that each logical partition is assigned a CPU processing weight that indicates priority. In order to manage the CPU relative weights, the sum of the relative weights for the logical partitions in a given group are to remain constant before and after the directed change, via, for instance, workload manager. This maintains the customer specified allocation of the resources to the groups and other logical partitions present on the machine.

Notwithstanding the above, in some cases it may be desirable and possible for the group of partitions to utilize resources greater than the defined container, when those resources are not being used by their designated owners. However, as soon as contention for the resources occurs, the resources are managed by the LPAR manager according to the defined container sizes (e.g., processing weights in this example). There may, however, be other cases when the group should not be allowed to expand beyond its container. This is also possible with scoping. Other resources may need to be fully scoped to a single group in order to get an accurate picture of usage of the resources. Limiting in this fashion prevents logical partitions outside of a given group from accessing that resource.

In addition to the above, consideration is also given to the effect of external changes to the availability of resources within a logical partition group. For example, a user may change the allocation of resources via some external means (not under workload manager direction). This might be done because of a change in actual workloads that are on a machine or a shift in business priorities between groups and/or other logical partitions. When these changes are made, these changes are to be understood by the workload manager and the effects of these changes are to be distributed rationally. Changes might occur when a logical partition is added or removed from a group; when some other logical partition outside the group is added or removed; or simply, when a processing weight change is done via external means. When these external changes are performed, the size of the container can change and workload manager is now the manager of that newly sized container.

When resources attributed to a particular logical partition of a group are changed externally, the redistribution of resources within a group may be needed. For instance, when a logical partition is removed from a group, the processing weight associated with that logical partition is removed from the group. If the current workload manager assigned weight for the logical partition is greater than the logical partition's weight that is being removed (i.e., the processing weight associated with the logical partition initially), the difference between these weights are added to other logical partitions in the group. This is done, for instance, in proportion to the existing distribution of weights in the other logical partitions in the group. If the current workload manager assigned weight for the logical partition is less than the logical partition's initial weight, the difference between these weights is subtracted from the other logical partitions in the group. Again, this is done in proportion to the other logical partition weight assignments, as one example.

As described above, a group is scoped in order to obtain a handle on the resources that are assigned to a group and the resources that are allowed to change, so that workload manager can make proper decisions of what to do next. The scoping identifies the groups and provides information back to the program that the program can understand. When a group is modified, the resources are dynamically adjusted to satisfy the modification.

In one embodiment, there can be separate groups (clusters) for each resource. For example, Logical Partition Group A may be for CPU resources, while Logical Partition Group B may be for I/O resources. However, in other embodiments, it is also possible that one logical partition group is for a subset or all of the resources.

Figure 4A:
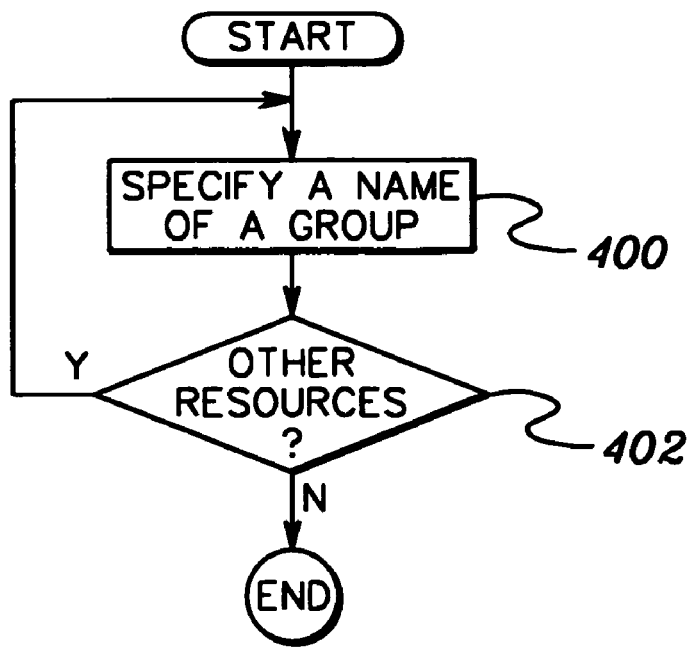
FIGS. 4a–4b depict one example of the logic associated with a partition joining a group, in accordance with the principles of the present invention.
Figure 4B:
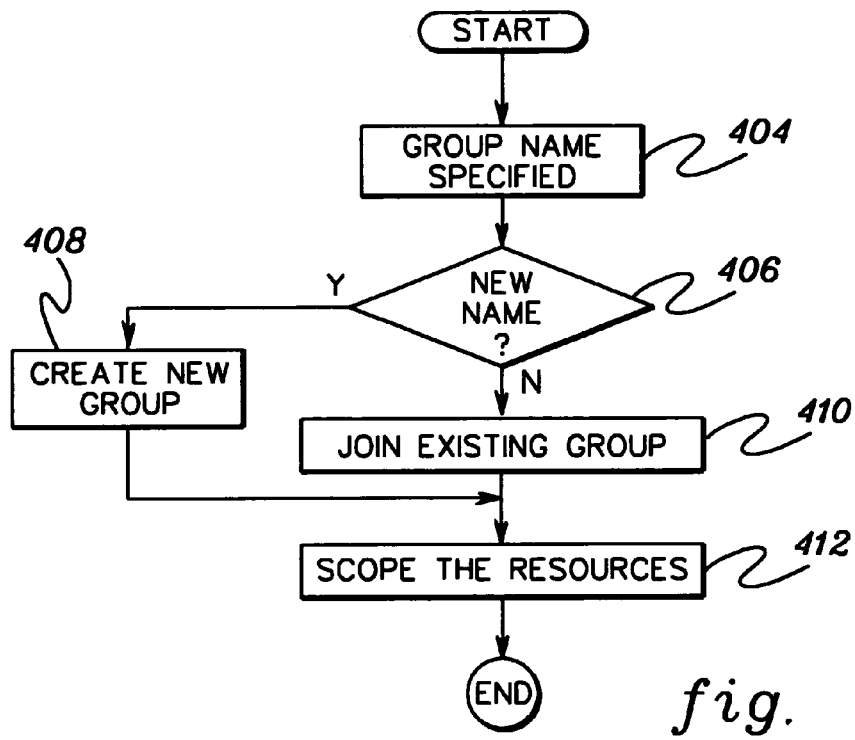

In order to establish LPAR group scope, in one example, the logical partitions identify themselves to one or more groups of partitions. One embodiment of the logic associated with joining a group is described with reference to FIGS. 4a–4b. For example, to join a logical partition group, the operating system (e.g., OS/390) running in a logical partition indicates to the LPAR manager which LPAR group the logical partition is to be a part thereof, STEP 400. As one example, an instruction is used to pass the LPAR group name to the LPAR manager. The operating system specifies a name for each type of resource that is to be managed within LPAR groups. Thus, if there are other resources, INQUIRY 402, then other names are specified. For example, a group name is given for CPU resources and another name is given for I/O resources. The same LPAR group name can be specified for each resource type, if desired.

This declaration by OS/390 either establishes a new LPAR group on the machine (if the logical partition is the first logical partition to use that name) or causes this logical partition to join an existing LPAR group of the same name for that resource type. For example, once the group name is specified, STEP 404 (FIG. 4b), a determination is made as to whether it is a new name, INQUIRY 406. If so, a new group is created, STEP 408. Otherwise, an existing group is joined, STEP 410. Thereafter, the resources are scoped to the group, STEP 412.

In particular, the resources of the group type that are bound to the LPAR group are now made available for that logical partition to utilize, if and when WLM running in the LPAR group determines it should. The resources of a particular type for an LPAR group that need scoping include at least two varieties: additive resources and fixed resources.

Additive Resources: In some cases, joining an LPAR group inherently adds resources to the LPAR group that the logical partition just joined. An example of this is CPU processing weight, which is, for example, assigned by the customer to a logical partition at a hardware console. The current (in use) processing weight of the logical partition is initialized from this customer assigned weight, when the logical partition is activated. When the logical partition joins an LPAR group for CPU resources, the customer assigned processing weight for that logical partition becomes part of the total processing weight available for use within the LPAR group, and thus, can be reassigned within the LPAR group by WLM. The logical partition that just joined the LPAR group now has the potential to use the larger set of LPAR group resources, in which a contribution to was just made.

Fixed Resources: In some cases, a set of resources is predefined as belonging to a particular LPAR group. An example of this is managed (floating) channel paths. A managed channel path is a channel path whose resources can be reassigned to help achieve workload goals. The set of managed channel paths for use by a particular LPAR group is initially defined via an I/O configuration definition process that associates channel paths (CHPIDs) with an LPAR group. When a logical partition joins this LPAR group, it is now allowed access to this set of channel paths. The logical partition itself did not contribute anything to this resource pool. (This pool of resources can still be changed dynamically, but the point is that the resources do not come and go as logical partitions join and leave an LPAR group.)

LPAR scope can also be enforced differently for resources depending on the type of resource.

Additive Resources: The operating system in an LPAR group is to be able to query the complete set of resources of this type for the LPAR group. As an example, for CPU processing weights, this is accomplished via an instruction. The operating system learns the total set of this resource type within the LPAR group, the allocation of the resources to the logical partitions in the group, and the complete size of the resource pool available on the current machine. All these components are used to understand how much of the total physical resource is to be allocated to a logical partition. The operating system then updates the allocations to the logical partitions in the LPAR group to reassign resources within the group. The operating system is not allowed, in one example, to change the total amount of resource allocated to the LPAR group. The LPAR manager enforces this by making sure that all parts of the LPAR group are accounted for in an update and no logical partitions outside the LPAR group have their resources affected.

Fixed Resources: The operating system in an LPAR group queries the set of resources that is associated with its LPAR group for this type of resource. For example, with managed channel paths, a list of managed channel paths that are defined for a particular LPAR group can be retrieved from the LPAR manager via an instruction. The LPAR manager also screens these resources to be sure they are only utilized by the proper LPAR group. For managed channels, this means only allowing a managed channel path to be configured online to a logical partition that has declared an LPAR group name that matches that defined for the managed channel path.

Figure 5:
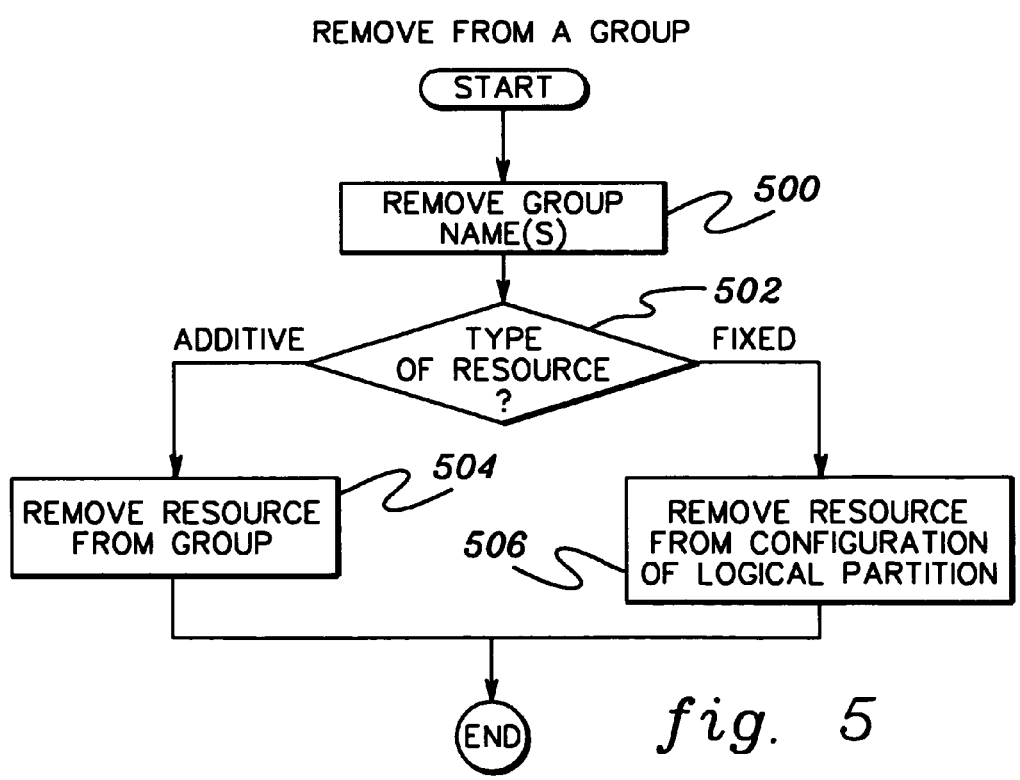
FIG. 5 depicts one embodiment of the logic associated with removing a partition from a group, in accordance with the principles of the present invention.

When a logical partition that is part of an LPAR group is system reset, re-IPLed, or deactivated, any affiliation that logical partition had with one or more LPAR groups is removed. One embodiment of the logic associated with removing a logical partition from a group is described with reference to FIG. 5. As part of the resets, the logical partition manager removes a declared LPAR partition group name(s) from the logical partition, STEP 500. Then, one or more other actions are performed to complete the LPAR group resource deallocation for the logical partition, depending on the resource, INQUIRY 502.

If the resource is an additive resource, then the following occurs: resources such as this, that were added into an LPAR group when a logical partition joined the LPAR group, are removed from the LPAR group, STEP 504. This may involve an adjustment in the current allocation of this type of resource to the remaining members of the LPAR group. For instance, in the case of processing weights, the initial processing weight for the logical partition leaving the group is now removed from the scope of the LPAR group. If WLM had changed the current processing weight for the logical partition, adjustments need to be made. If the logical partition's current processing weight is greater than its initial processing weight, the difference between the two is redistributed to the remaining LPAR group members in proportion to their current processing weights. If the logical partition's current processing weight is less than its initial processing weight, the difference between the two is removed from the remaining LPAR group members in proportion to their current processing weights. The result of these adjustments re-establishes what the processing weight container is for the resulting LPAR group.

On the other hand, if the resource is a fixed resource, then the following occurs: resources such as these are simply removed from the configuration of the logical partition being reset, STEP 506. For instance, for managed channel paths, the channel paths are deconfigured from the logical partition being reset. This once again re-establishes that only members of the LPAR group have access to the LPAR group resource.

It should also be noted that some resources managed by WLM in an LPAR group environment may not have a need for group scoping. One example of such a resource is the number of logical central processors (CP) online for a logical partition. The effective behavior of a particular logical partition in an LPAR group can be significantly influenced by the number of logical CPs that are online to the logical partition. The number of logical CPs that a logical partition can have defined and/or online is a characteristic of a logical partition whether or not is it is in an LPAR group, so this resource does not really become part of a larger pool of resources. Its effect in an LPAR group though is that it can change what type of workload can effectively be run in one LPAR group member versus another.

In one example, a resource to be shared among a plurality of logical partitions is a CPU resource. In one aspect of the present invention, the OS/390 workload manager redistributes CPU resources across logical partitions by dynamically adjusting one or more relative processor weights associated with the logical partitions. WLM understands when an important workload is delayed because the weight of the partition it is running within is too low. WLM can help this workload by raising the weight of this partition and lowering the weight of another partition, thereby providing additional CPU capacity to the important workload. CPU resources dynamically move to the partitions where they are needed, as workload requirements change.

In one embodiment, the scope of WLM management of logical partition weights is a logical partition group. As one example, WLM adjusts logical partition weights, but maintains the sum of the weights of the partitions in the group constant. Maintaining the sum constant, keeps the overall CPU resource allocated to the group the same relative to other independent groups on the same physical computer. Therefore, when WLM raises the weight of one partition, it lowers the weight of another partition in the same group.

The management of logical partition weights is an enhancement to WLM's goal oriented resource allocation techniques, which are described in, for instance, U.S. Pat. No. 5,473,773, Aman et al., entitled "Apparatus And Method For Managing A Data Processing System Workload According To Two Or More Distinct Processing Goals", issued Dec. 5, 1995; and U.S. Pat. No. 5,675,739, Eilert et al., entitled "Apparatus And Method For Managing A Distributed Data Processing System Workload According To A Plurality Of Distinct Processing Goal Types", issued Oct. 7, 1997, each of which is hereby incorporated herein by reference in its entirety.

As described in those patents, WLM controls the allocation of CPU resources within a logical partition by adjusting CPU dispatching priorities. CPU dispatching priorities are assigned to work at a service class level. However, there are various situations in which the adjustment of dispatching priorities does not help the service class. For example:

1) The service class is already alone at the highest CPU dispatching priority allowed to non-system work.
2) Changing CPU dispatching priorities to help the service class will have too large a negative impact on other service classes that are of equal or higher importance.

Thus, when WLM finds that a service class is missing its goals due to CPU delay, which cannot be helped by adjusting CPU priorities, WLM considers adjusting the weight of the partition associated with the failing service class.

Figure 6:
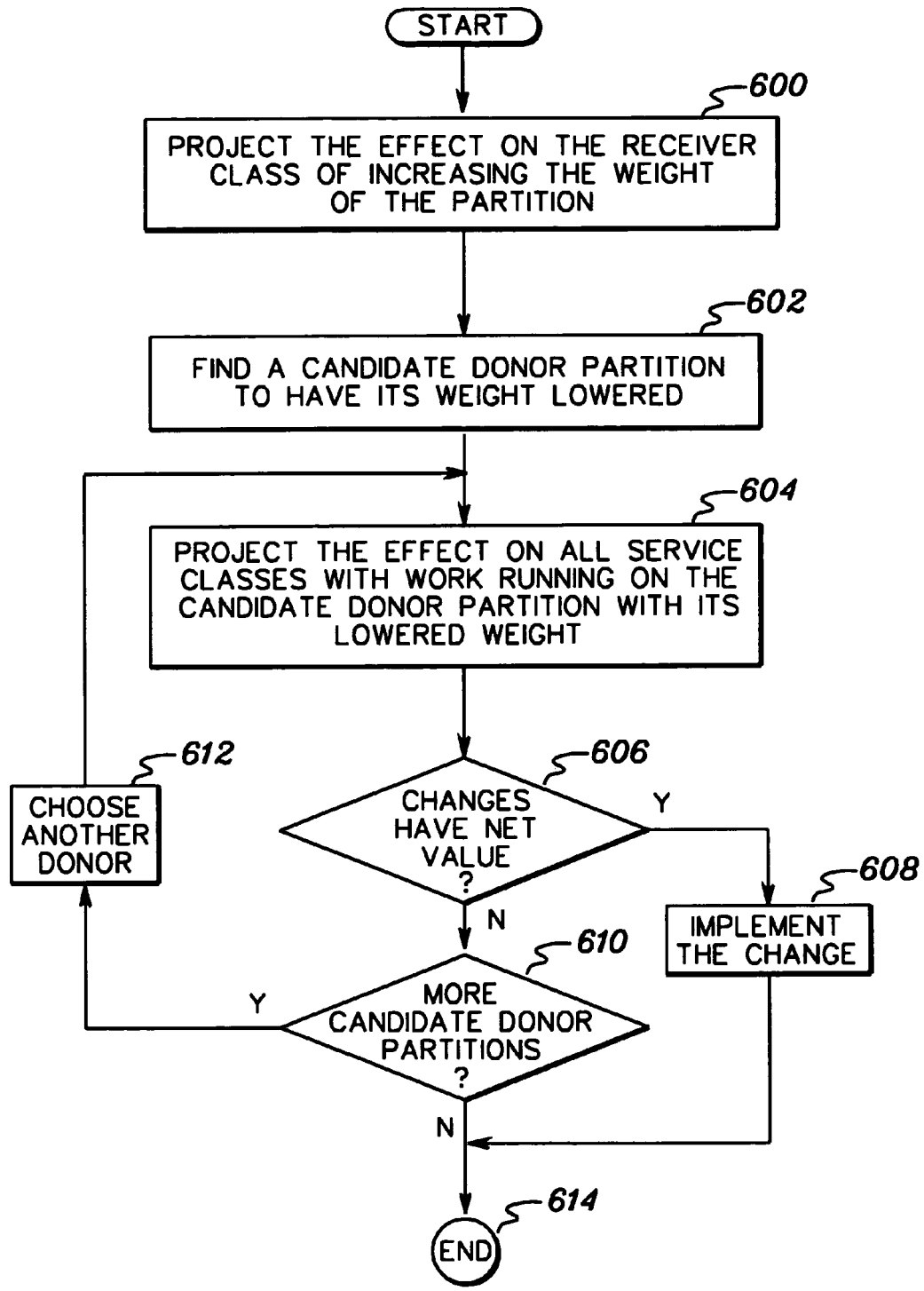
FIG. 6 depicts one embodiment of the logic associated with determining if a partition's weight can be increased to help a receiver service class of the partition, in accordance with the principles of the present invention.

The service class to which WLM is considering allocating additional resources is called the receiver service class. When WLM has found a receiver service class missing goals due to CPU delay on a given partition that cannot be helped for one of the reasons listed above, WLM considers raising that partition's weight. One embodiment of the logic followed by WLM to determine if a partition's weight can be increased to help the receiver service class is described as follows, with reference to FIG. 6:

1. Project the effect on the receiver class of increasing the weight of the partition, STEP 600. Increasing the partition's weight increases the CPU capacity of the partition. Since the CPU demand of the work in the receiver class is assumed to be constant, increasing the CPU capacity of the partition decreases the percentage of this capacity that the receiver service class demands. The projection of the benefit to the receiver service class is based on this decrease in the percentage of available CPU capacity both the receiver service class and the other work on the system demand.
2. Find another partition in the logical partition group to be a candidate to have its weight lowered, STEP 602. This partition is known as the candidate donor partition. The candidate donor partition is chosen by, for instance, looking for the partition where the least important work is likely to be impacted by lowering the partition's weight.
3. Project the effect on all service classes with work running on the candidate donor partition of lowering its weight, STEP 604. Decreasing the candidate donor partition's weight decreases the CPU capacity of the candidate donor partition. This decrease in CPU capacity means that the CPU demand of the service classes with work running on the candidate donor as a percentage of the capacity of the candidate donor will increase. The projection of the negative effect of reducing the candidate donor's weight is based on this increase in the percentage of available CPU capacity that these service classes demand.
4. Determine if this change in weight has net value, INQUIRY 606. That is, the benefit to the receiver service class overrides the negative impact to work on the candidate donor partition based on the goals and importances of the service classes involved.
5. If adjusting the weights does have net value, implement the proposed change to the partition's weights, STEP 608. If there is not net value, then a determination is made as to whether there are more candidate donor partitions, INQUIRY 610. If so, another candidate donor partition is chosen, STEP 612, and processing continues at step 3, STEP 604. If there are no more candidate donor partitions, then processing ends, STEP 614.

To enable WLM running on one partition to make a projection on the effect of changing partition weights on work running on another partition, each partition has access to a shared data structure containing performance data about each logical partition in the group. This partition level performance data includes, for instance:

CPU requirements of work running on the partition by service class;
How well each service class is doing towards its goal on the partition;
CPU usage by CPU dispatching priority for the partition.

In the OS/390 implementation of this invention, this shared data structure is built and maintained in a coupling facility. However, other data sharing approaches could be used to implement this data structure, such as messaging or shared disk.

Described above is a capability for dynamically redistributing CPU resources of a computing environment. The resources are redistributed across logical partitions, as one example, by dynamically adjusting logical partition weights.

In addition to dynamically adjusting CPU resources of a computing environment, logical processor resources may also be dynamically adjusted, in another aspect of the present invention.

A logical partition is configured with one or more logical processors, which are dispatched on the central processor complexes' physical central processing units to execute work. To allow a partition to consume its assigned CPU capacity, sufficient logical processors are to be configured to the logical partition. For example, consider the case of Logical Partition A running on a CPC with ten CPUs. If a workload manager assigns Logical Partition A 50% of the CPC's capacity, Logical Partition A needs at least five logical processors to be configured to it. (Five logical processors could run on five of the CPUs or 50% of the CPC's capacity.) Should Logical Partition A later be assigned 95% of the CPC's capacity, Logical Partition A would then be configured with ten logical processors. Since WLM can dynamically adjust the capacity assigned to Logical Partition A with a statically defined logical processor configuration, ten logical processors are configured to Logical Partition A in order to accommodate all possible capacity assignments. However, should Logical Partition A be assigned, for example, only 20% of the CPC's capacity, two problems arise from the statically defined logical processors: 1) Each of the ten logical processors will, on average, be allowed to consume physical CPU resources at the rate of only 0.2 of a physical CPU's capacity (20% of ten CPUs divided by ten logical processors equals 0.2 CPUs per logical processor). This can severely restrict workloads whose throughput is gated by a single task, since that single task will only be able to execute at 0.2 the capacity of the physical CPU—this is often referred to as the short engine effect; 2) Software and hardware efficiency is significantly reduced when having to manage ten logical processors, when only two logical processors are required.

Figure 7:
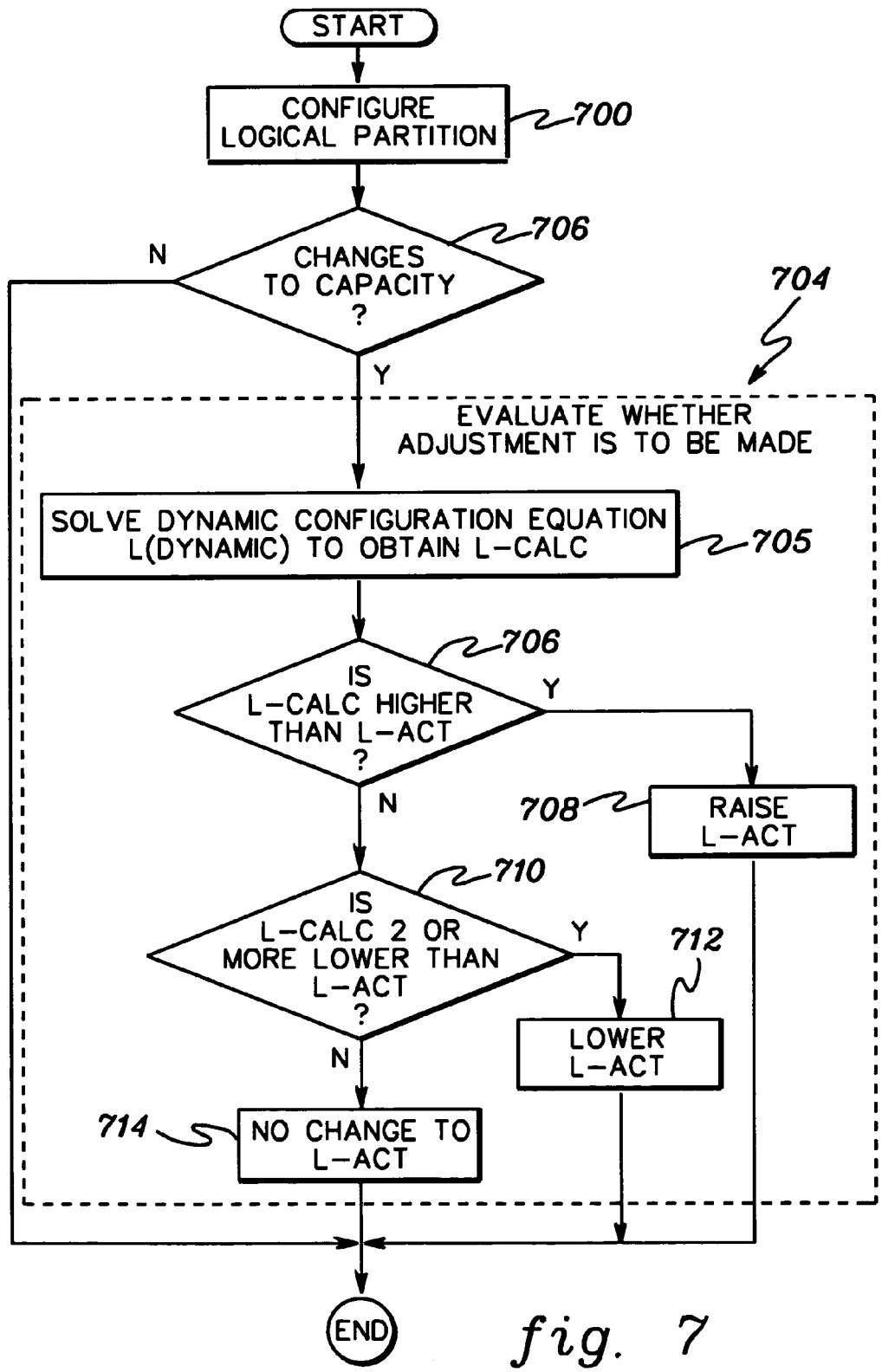
FIG. 7 depicts one embodiment of the logic associated with dynamically adjusting the configuration of logical processors, in accordance with the principles of the present invention.

In order to address the above deficiencies, the configuration of a logical partition is not statically defined, but instead is dynamically adjusted, in accordance with one aspect of the present invention. In one example, it is WLM that manages the partition and makes the dynamic adjustment. WLM can do this for each logical partition of a computing environment (or within an LPAR group). One embodiment of the logic associated with dynamic adjustment of the configuration of logical processors is described with reference to FIG. 7.

Initially, a logical partition is configured with the minimum number of logical processors required to allow it to consume the capacity assigned to the logical partition by workload manager (or the capacity actually being used, if larger), STEP 700. As the logical partition's capacity assignment (or capacity use) changes, INQUIRY 702, an evaluation is made to determine whether the number of logical processors configured to the logical partition should be altered, STEP 704. In one example, the number of logical processors configured to a logical partition remains close to the number of physical CPUs necessary to provide the CPC capacity assigned to (or used by) a logical partition. Thus, each logical processor executes at close to the capacity of a physical CPU and the number of logical processors to manage are minimized.

In order to make the evaluation of whether to change the logical configuration, the following equation is used in one example: L=floor[max(W,U)×P+1.5] subject to a maximum of L=P, where L=number of logical processors configured to a logical partition; W=percentage of CPC capacity assigned to the logical partition; U=percentage of CPC capacity currently being used by the logical partition; and P=number of physical CPUs on a CPC, STEP 705.

L is evaluated by workload manager based on the then current values of P,W and U at, for instance, regular and frequent intervals (e.g., every 10 seconds). Thresholds are used to determine if the actual value of L (L-act) for the logical partition should be raised or lowered. If the newly calculated value of L (L-calc) is higher than the current value of L-act, INQUIRY 706, then L-act is raised to L-calc, STEP 708. Otherwise, if L-calc is a value of two or more lower than L-act, INQUIRY 710, then L-act is set to L-calc minus one, STEP 712. If L-calc is equal to L-act or only a value of one below L-act, no change in the value of L-act for the logical partition is made, STEP 714. Through the use of these thresholds, unnecessary changes of L-act due to small workload fluctuations is avoided, while still being responsive to quickly increasing capacity demands of workloads.

For further illustration, consider the following example: Assume P=10, W=U=24%. A static configuration of logical processors would require L(static)=10 to handle the case should W grow greater than 90%. However, in accordance with this aspect of the present invention, L(Dynamic)=floor [max(0.24, 0.24)×10+1.5]=3. Thus, in this example, L(static) would constrain a single task to execute at 0.24 of a physical CPU, while L(Dynamic) allows a single task to execute at 0.80 of a physical CPU, thereby providing a 233% increase in throughput for workloads gated by single task performance. Additionally, the software and hardware efficiency is significantly improved due to this aspect of the present invention since, in this example, only three logical processors are managed rather than the ten logical processors needed for L(static).

Another shareable resource of a computing environment to be managed, in accordance with one aspect of the present invention, is an asynchronous resource, such as an I/O resource. In particular, I/O operations or requests within a coprocessor (e.g., a channel subsystem) are to be managed. This management includes prioritizing the I/O operations, such that I/O operations with a higher priority get processed quicker, and/or I/O operations with a higher priority are assigned more bandwidth of the channel.

Figure 8:
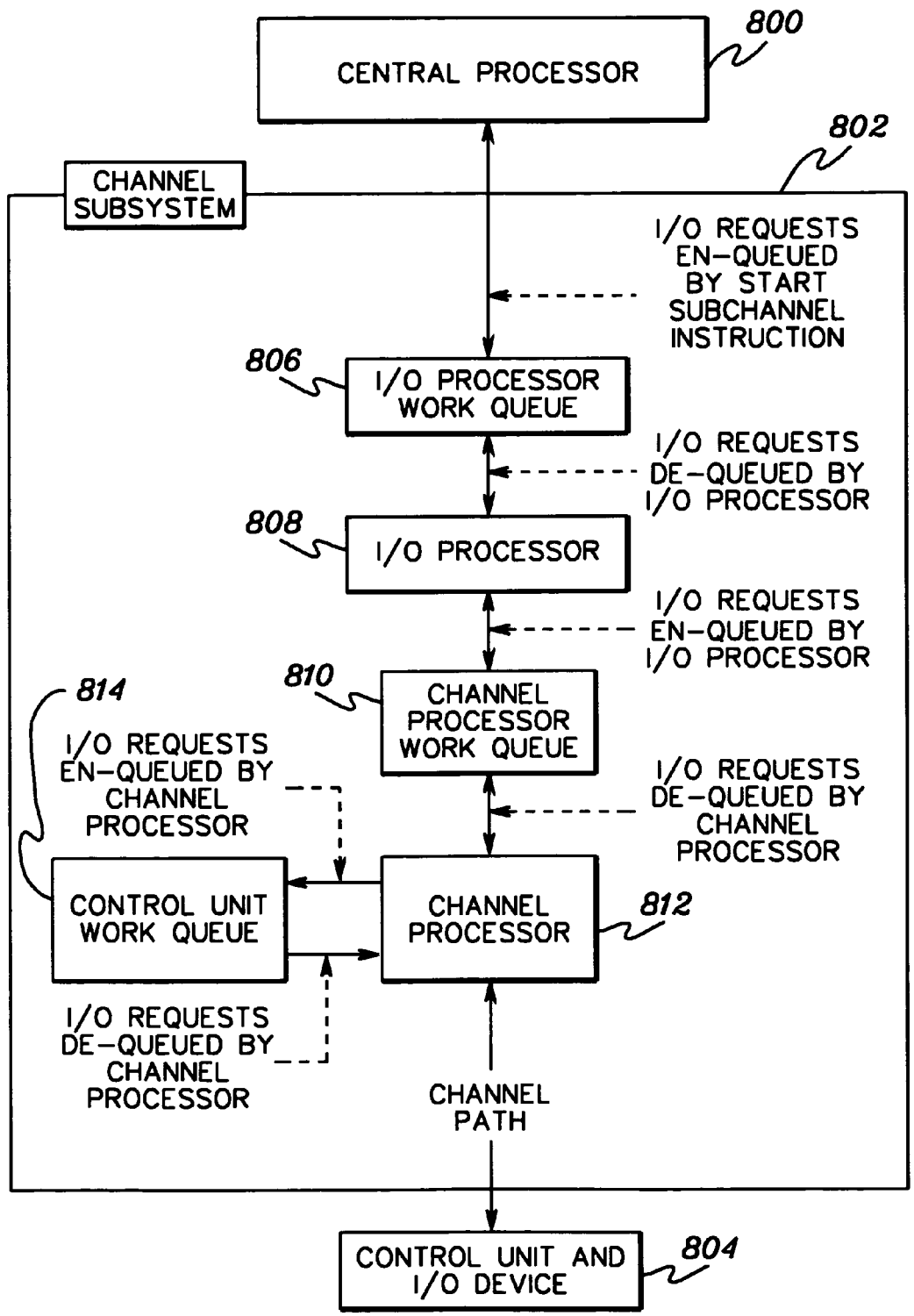
FIG. 8 depicts one embodiment of a channel subsystem incorporating and using one or more capabilities of the present invention.

In contemporary large scale multi-programmed computing systems, the initiation and execution of long running processes, such as I/O operations for reading, writing, and controlling attached I/O devices, is typically accomplished by the use of several independently operating computing elements (see FIG. 8). For example, a program executing in a central processor 800 may request an I/O operation with an attached device 804; however, the actual initiation and execution of the I/O operation with the attached device is carried out by one or more separate and independently executing processors working together, typically called a channel subsystem 802. The asynchronous I/O processing methodology is generally employed in order to optimize and efficiently use the central processor for other work concurrently with the execution of the relatively long running I/O devices. That is, to minimize the total processor overhead, processing time, and processor wait time that would otherwise be required in order to access and to read/write at the attached I/O devices. Such a methodology is designed to achieve maximum overlap, or concurrency of execution, of I/O operations with the execution of other processor work in a large multi-programmed system.

In such asynchronous I/O processing systems, the central processor initiates the execution of a program requested I/O operation by use of an I/O instruction, such as the S/390 START SUBCHANNEL instruction. Such an instruction is typically responsible for:

1. En-queuing (adding) the I/O operation request on a channel subsystem I/O work queue; and
2. Signaling the asynchronously executing channel subsystem to process the I/O work queue.

Subsequently, the central processor is free to perform other work/instructions and is not directly involved in the actual execution of the requested I/O operations with the I/O device.

Due to 1) the asynchronous nature of the above process, 2) the independent operation of the central processor and the channel subsystem processors, 3) the relatively long execution time of I/O operations in comparison to the execution speed of the central processors, and 4) the fact that some or all of the channel subsystem resources, such as the channel paths which connect the device to the channel subsystem, may be busy performing other operations when an I/O operation is requested by a program, it is highly probable that multiple I/O requests will be concurrently enqueued on the channel subsystem I/O work queues. That is, the START SUBCHANNEL instruction is executed by the central processors at a greater rate than the channel subsystem's ability to carry out the requested I/O operations, thereby continually causing N-level deep I/O work queues of pending I/O operation requests.

In order to process the pending I/O requests, the microprocessors that comprise the channel subsystem inspect their respective I/O work queues (see FIG. 8), de-queue one or more I/O requests from these queues and attempt to initiate the de-queued I/O requests with their respective I/O devices. The initiative for this activity depends on the microprocessor and work queues in question within the channel subsystem. For example, the channel subsystem I/O processor that interacts with the central processor might initiate this process periodically when it is not busy performing other work, as the result of one or more central processor START SUBCHANNEL signals, or a combination of both.

One example of the various work queues of a channel subsystem are described with reference to FIG. 8. As previously mentioned, I/O requests are en-queued on an I/O processor work queue 806 by, for instance, the START SUBCHANNEL instruction. I/O requests are then de-queued from the I/O processor work queue by an I/O processor 808. The requests that are de-queued from the I/O processor are en-queued by the I/O processor onto a channel processor work queue 810. Thereafter, those requests are de-queued by a channel processor 812 and en-queued onto a control unit work queue 814. The channel processor then de-queues requests from the control unit work queue to be sent via the channel path to the control unit and ultimately to the I/O device.

Currently, within the S/390 product family of systems, channel subsystem de-queuing and work initiation processes are performed on a First-In, First-Out (FIFO) basis. This process is logically the simplest to implement, is intended to optimize throughput, and has in the past, been an acceptable strategy for work transfer between the various asynchronous processing elements given that the average depth of the pending work queues is relatively shallow and that I/O work pending times remain relatively short in duration (i.e., that the average number of pending I/O requests on the various I/O work queues does not cause significant elongation of the total I/O response time for I/O operations associated with high importance and/or real-time critical programs).

However, in operating systems that provide application/program prioritization functions in order to support user demands for timely processing of critical or time dependent work, a FIFO processing strategy for pending I/O requests becomes increasingly less acceptable, as the average depth of the FIFO work queues increases. For example, parallel access volumes used in conjunction with the IBM Enterprise Storage Server increase the average queue depth in the channel subsystem. This is typically due to the fact that lower importance or less time critical I/O requests may be queued ahead of the more important requests on the FIFO work queues and would therefore be initiated before the more critical I/O requests. Frequently, less critical work performs I/O which ties up resources for longer periods of time, increasing the delay encountered by more important work. This typically results in an increased probability of delay for the more important I/O requests.

An increase in delay time, also called I/O pending time (which might be either total real-time delay or relative time delay when compared with the central processor speed) is often due to the inability of the channel subsystem and the attached devices to maintain a rate of I/O execution that does not impact the timely completion of the critical I/O requests. (Said differently, the inability to maintain an execution rate that does not result in an unacceptable elongation in the execution time of the high importance/time critical programs). As stated above, the probability of an unacceptable elongation in total I/O response time for critical I/O requests generally increases when a FIFO work processing methodology is used. This probability of delay is further magnified as the speed and number of central processors increases at a greater rate than the increase in speed of the attached I/O devices and other required channel subsystem elements, such as the channel paths to which the devices are attached. In general, the disparity in the rate of central processor speed increase over the rate of I/O speed increase continues to grow in contemporary large system environments resulting in increasingly higher probability for queuing delays and larger I/O response times (either real-time or relative time) for critical work.

In order to minimize the frequency of elongated I/O response times for high importance and time critical I/O operations, as examples, due to queuing delays at the channel subsystem, a priority handling technique is defined for processing one or more of the channel subsystem pending I/O work queues.

Examples of the implementation of a priority processing technique between two independently executing processors or processes include the following:

1. An en-queuing processor (or process) adds I/O requests to a channel subsystem I/O work queue (the particular queue depends on the stage of processing) using a priority sequencing technique based on a program specified (e.g., by WLM) priority number. The channel subsystem subsequently removes the first, highest priority I/O request from the work queue, using a FIFO technique; or 2. An en-queuing processor (or process) adds I/O requests to the bottom of the I/O work queue, using a FIFO en-queuing technique. The channel subsystem, using a priority selection technique, subsequently searches all I/O request elements on the work queue and removes and processes the I/O request with the highest program specified priority number.

The FIFO en-queuing technique (technique #2) requires fewer instructions, and therefore, allows the central processor to complete the I/O request scheduling process more quickly. This frees the central processor to perform other work more quickly. For the en-queuing/de-queuing process between the various microprocessors that comprise the channel subsystem, the technique to choose typically depends on which of the participating processors is the most constrained with respect to its processing capacity and timeliness requirements. That is, if the en-queuing processor is the most constrained, then the second technique is chosen. If the de-queuing processor is the most constrained, then the first technique is typically chosen.

Regardless of which of these technique is employed, the result is that the channel subsystem gives preference to the initiation and execution of pending I/O requests based on a prioritization methodology, not a time-of-arrival or FIFO methodology.

Further, in one embodiment, regardless of the en-queuing and selection techniques employed, various criteria are used to prioritize and/or select a request to be processed. In one example, these criteria include the following:

1. The selection of pending I/O requests based on a program specified priority number where each different number corresponds to a unique priority level. For example, a range of consecutive unique numbers is to be provided and the total range of numbers is to be equal to or greater than the total number of distinct work categories that require priority differentiation. For example, if the system provides the ability to concurrently execute N different operating systems, such as is possible with a typical S/390 system, then the channel subsystem priority techniques are to provide for N or more distinct priority levels. Each priority level, from the lowest to the highest level or vice versa, would be represented by a unique number in the range of 0 to N−1.

Figure 9:
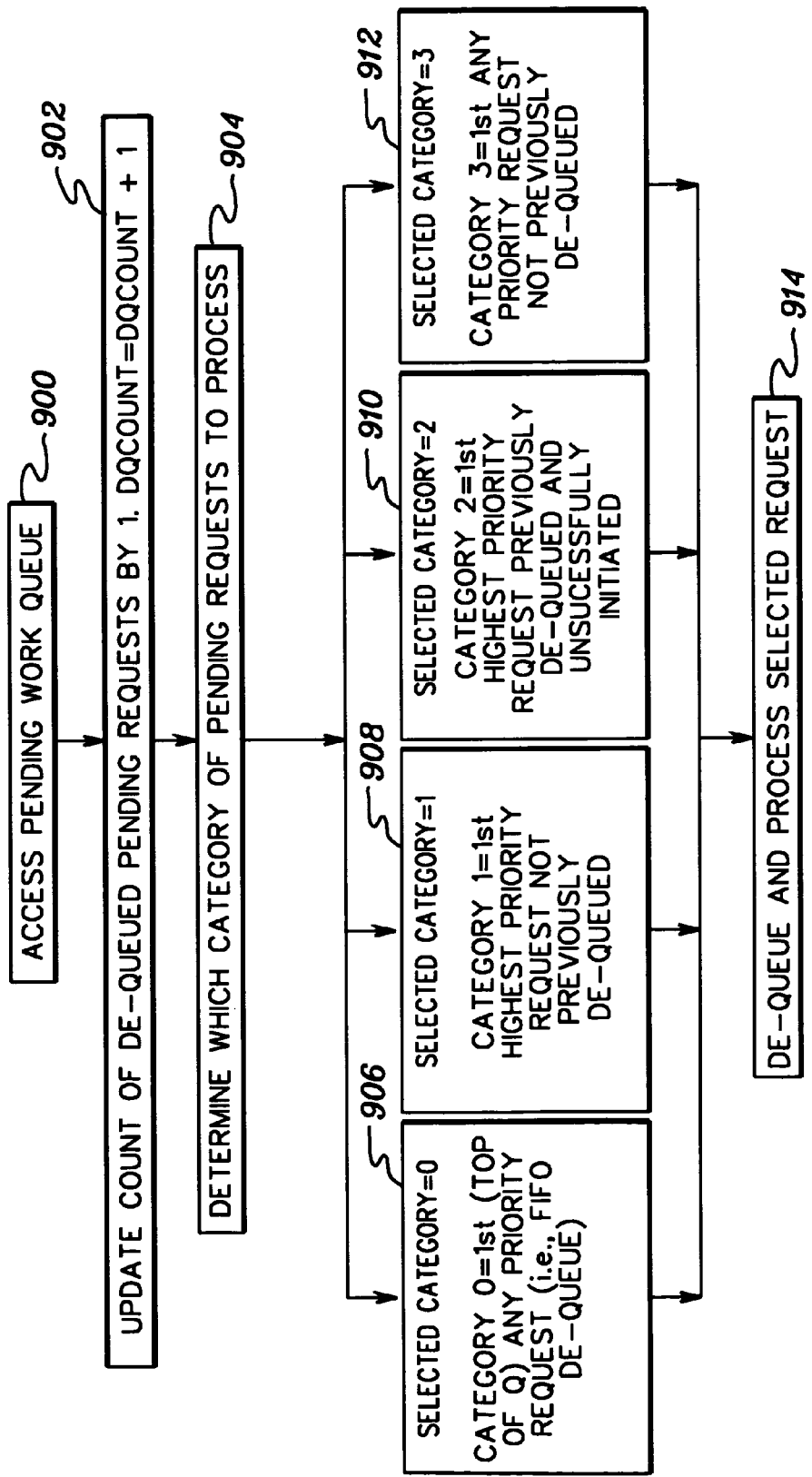
FIG. 9 depicts one embodiment of the logic associated with selecting an I/O operation to be processed, in accordance with the principles of the present invention.

2. The priority selection of pending I/O requests using a technique that also applies "fairness" to all en-queued requests regardless of their priority. This is typically desired in order to minimize the probability of lower priority requests not being processed for extended periods of time which could occur, for example, due to a disproportionately large number of higher priority requests being presented to the channel subsystem for an extended period of time. Fairness selection might also be applied to equal priority pending requests depending on other considerations. For example, to provide fairness for pending requests that have already been dequeued, unsuccessfully initiated, and re-queued one or more times with other equal priority requests that have not yet been selected. Such a technique is described with reference to FIG. 9. This technique applies both priority and fairness to a plurality of different categories of pending requests.

3. External user/operator controls for:
   1. Globally enabling/disabling the priority processing techniques. This control may be required in order to force FIFO processing of the pending requests, if the priority techniques are unnecessary or unable to adequately accommodate an atypical program execution environment.
   2. For systems that provide the concurrent execution of multiple logical partitions, an external control that allows the user to specify a "default" priority value for I/O requests associated with a given logical partition. This is used when the operating system executing in the logical partition is not designed to specify a priority value for its I/O requests, but which is to nevertheless successfully compete with other operating systems executing in other logical partitions that do specify I/O prioritization.
   3. For systems that provide the concurrent execution of multiple logical partitions, an external control that allows the user to specify a subset minimum and maximum range of priority values for each logical partition, from the total set of values provided by the channel subsystem. This control is used when multiple operating systems executing in separate logical partitions use I/O prioritization independently and without knowledge of the other using partitions. That is, to allow for priority based segregation of the requests initiated by each using partition.

For items 3.2 and 3.3 above, in one embodiment, the central processor implicitly assigns the user specified default priority value or the user specified minimum/maximum allowed priority for the program executing in the logical partition in a manner that is transparent to the program operating in the partition. In S/390 systems, this can be accomplished jointly by the logical partition manager (hypervisor) and the central processor START SUBCHANNEL instruction.

When the program operating in the logical partition executes START SUBCHANNEL, in order to initiate an I/O operation, the interpretative execution of the START SUBCHANNEL instruction in the central processor implicitly acquires both the default priority number and the minimum/maximum allowed priority numbers from a Start Interpretive Execution (SIE) State Description (SD) table. This table is created and loaded into the central processor by the logical partition hypervisor, when it executes the SIE instruction in order to place the partition into an Execution State. The interpretative execution of START SUBCHANNEL then uses the SIE state description table default and min./max. priority values to implicitly set the appropriate priority value into the I/O request without involvement by the program operating in the logical partition.

When a priority value is not specified by the program executing in the logical partition, START SUBCHANNEL interpretation assigns the user specified default priority value to the I/O request. When the program executing in a logical partition does specify a priority number when it executes START SUBCHANNEL, the interpretive execution of START SUBCHANNEL compares the program specified priority value with the hypervisor specified min./max. priority values in the state description table. When the program specified priority is less than the hypervisor specified minimum value, the minimum value from the state description table implicitly replaces the program specified value. When the program specified priority value is greater than the hypervisor specified maximum priority, the maximum priority value from the state description table replaces the program specified value.

A priority selection technique can be devised using zero or more of the above criteria. One embodiment of a technique for selecting a request to be processed, which uses at least some of the above criteria, is described with reference to FIG. 9.

Initially, a pending work queue is accessed, STEP 900. For example, either the I/O processor work queue, the channel processor work queue or the control unit work queue is accessed. Thereafter, the count of de-queued pending requests is incremented by one (e.g., DQCOUNT=DQCOUNT+1), STEP 902.

Subsequently, a determination is made as to which category of pending requests is to be processed, STEP 904. In one example, the selected category is equal to DQCount MODULUS the number of categories. Thus, since in this example there are four categories, the selected category equals DQCount MODULUS 4. If the result is 0, then the first request of any priority is de-queued, STEP 906. However, if the selected category is 1, then the first highest priority request not previously de-queued is selected, STEP 908. Further, if the selected category is 2, then the first highest priority request previously de-queued and unsuccessfully initiated is selected, STEP 910. However, if the result is 3, then the first any priority request not previously de-queued is selected, STEP 912. Thereafter, the selected request is de-queued and processed, STEP 914.

Described in detail above, is a prioritization mechanism for asynchronous requests within a coprocessor. Although the examples are described with reference to I/O requests and channel subsystems, these are only examples. The invention is equally applicable to other asynchronous requests and coprocessors. Further, although the example described above is described with reference to queuing, a similar prioritization mechanism can be used to adjust the assignment of resources (e.g., bandwidth) on the channel, which is capable of concurrently executing multiple operations, giving more of the channel resource to the higher priority operations, rather than everything running equally.

Further, although various examples described herein are described with reference to a logically partitioned system, various aspects of the present invention, including but not limited to, the I/O priority capabilities of the present invention are useable within a system that does not have or support logical partitions.

In accordance with yet another aspect of the present invention, the I/O configuration (e.g., the channel path configuration) of a computing environment can be dynamically changed in order to move available channel resource to where it is needed or to remove excess channel resource, without human intervention. This reduces the skills required for configuring I/O, enhances overall system availability, maximizes utilization of installed channels and uses the relative priorities of workloads to distribute available I/O capacity. In one embodiment, one or more factors are looked at before making a change, in order to determine the "best" change to make. These factors include, for example, the impact to the response time, or I/O velocity; the impact to the response time to achieve specific workload goals; the destination port being busy; the resulting availability characteristics (e.g., add paths with no single points of failure in common); and the resulting complexity (or entropy) of the I/O configuration.

One embodiment of the logic associated with dynamically adjusting an I/O configuration is described in detail with reference to FIGS. 10–14. Initially, base balance processing is invoked by, for instance, a workload manager component of the computing environment at the start of regularly scheduled time intervals, e.g., every 10 seconds. The function of the base balance processing is to continuously balance the I/O velocity evenly across the subsystems (e.g., logical control units) (with floating (i.e., managed) channels defined); assure that all devices can be accessed through two or more paths, preferably with no single points of failure in common; and rebalance subsystems after a hardware failure. This processing includes two components: data collection, STEP 1000 (FIG. 10) and balance checking, STEP 1002. Data collection is run once each interval within each logical partition of the environment (assuming the environment is logically partitioned or within each system if it was not logically partitioned); and balance checking is only run once per interval per grouped LPAR (again, assuming grouping).

Serialization of the data collection part of the processing is obtained by the fact that WLM only invokes the base balance technique once per interval in any one system. Additionally, version number checking is used when updating the collected information. For example, control blocks stored within the coupling facility are serialized to update the collected information. These control blocks enable a group level data collection, which allows the management of channels across members of a group on the same CPC.

In order to serialize the balance checking, serialization with a group scope specifically for that purpose is used. Typically, when balance is called immediately after data collection, group-wide serialization is requested. If the serialization is obtained, balance checking proceeds; if not, then balance checking is already occurring within the grouped LPAR, and need not run again during this interval.

Figure 10:
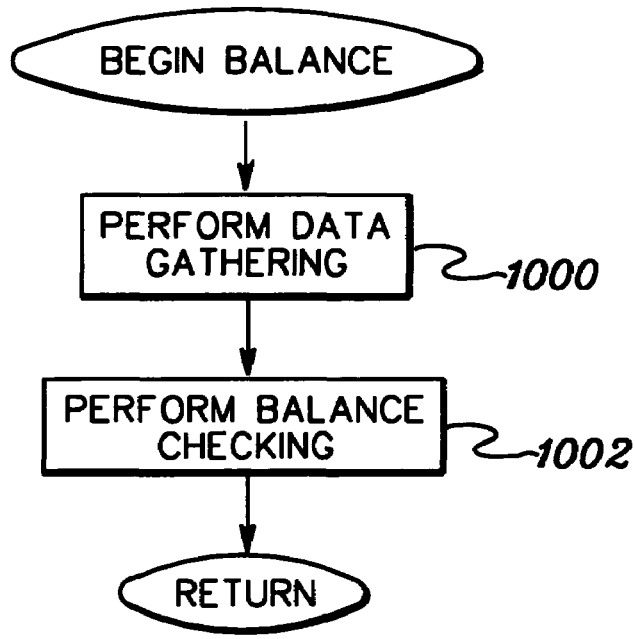
FIG. 10 depicts one embodiment of the logic with determining whether an I/O configuration is to be adjusted, in accordance with the principles of the present invention.
Figure 11:
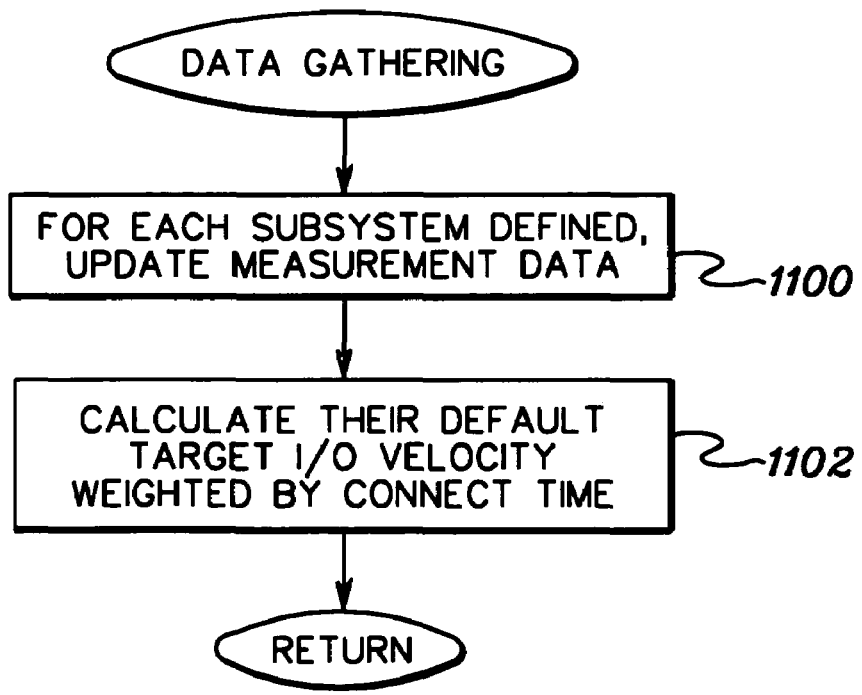
FIG. 11 depicts one embodiment of the logic associated with the data gathering of FIG. 10, in accordance with the principles of the present invention.
Figure 12:
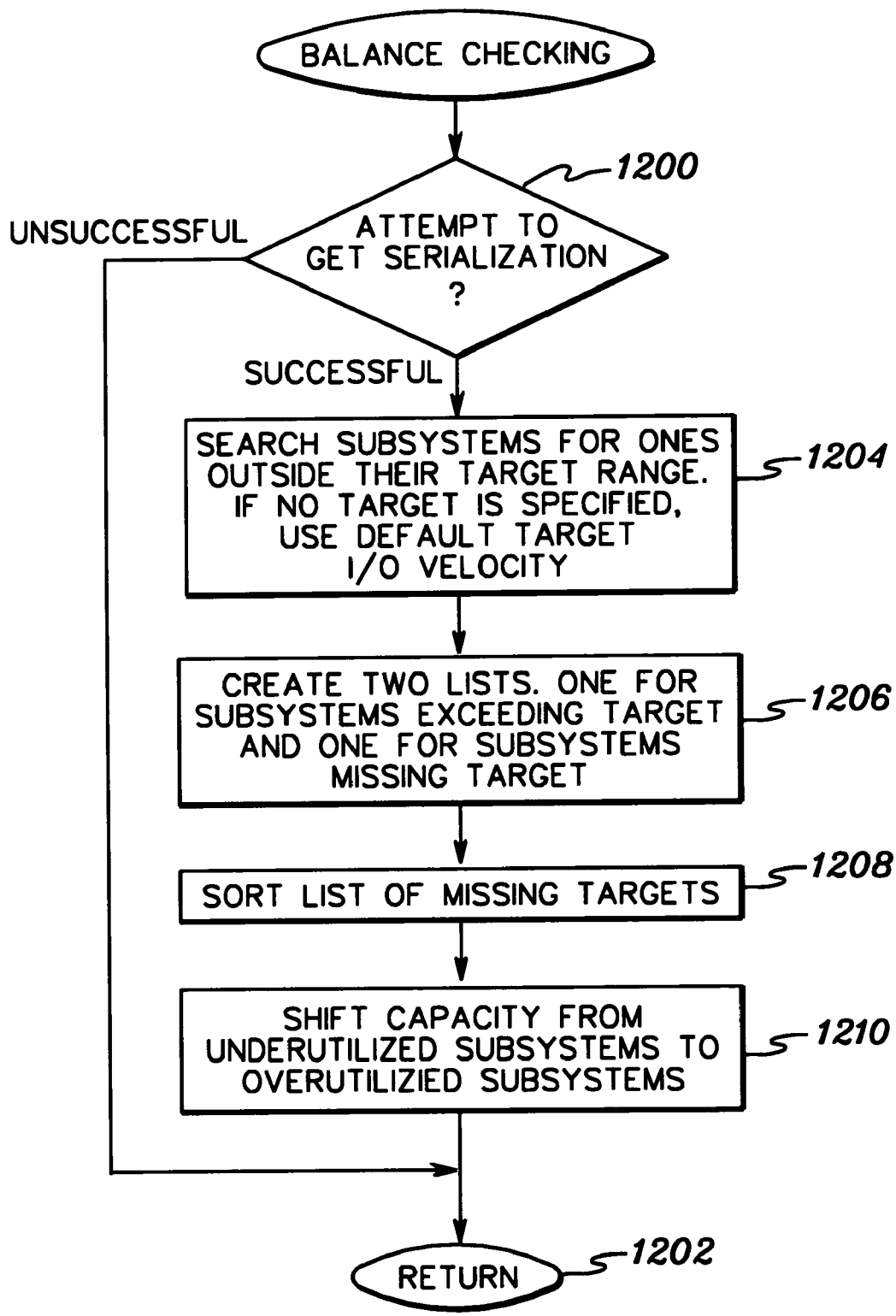
FIG. 12 depicts one embodiment of the logic associated with the balance checking of FIG. 10, in accordance with the principles of the present invention.

The data collection processing of FIG. 10 is further described with reference to FIG. 11. In one embodiment, measurement data is collected and updated, for each subsystem (e.g., logical control unit) defined, STEP 1100. The measurement data includes, for instance, connect time, pending time, subsystem busy, device busy, destination port busy time, and destination port busy counts. The updated measurement data is stored in control blocks within processor memory, along with control blocks within shared memory, such as the coupling facility.

Subsequent to updating the measurement data, a default target I/O velocity for each subsystem is calculated, STEP 1102. The I/O velocity indicates whether additional channel bandwidth is needed or desired. As one example, the default target I/O velocity is weighted by connect time. In order to perform this calculation, the following steps are taken, in one instance: For each subsystem managed by DCM, the current or actual velocity is obtained, along with the amount of connect time afforded that subsystem during the past interval. The I/O velocity is then multiplied by the connect time to obtain a result. The results for the subsystems are then added together to obtain a sum. The sum is then divided by the total connect time in order to determine a default target I/O velocity weighted by connect time.

Returning to FIG. 10, after performing the data gathering, balance checking is performed as described herein, STEP 1002. One embodiment of the logic associated with balance checking is described with reference to FIG. 12. Initially, serialization is performed to determine whether balance checking should be performed at this instance, INQUIRY 1200. If the attempt to get group-wide serialization is unsuccessful, then the balance checking logic is not performed, STEP 1202. However, if serialization is obtained, then the subsystems are searched for those outside their target range, STEP 1204.

For example, the actual I/O velocity is obtained for all of the subsystems and then an average is taken. (In one example, only those subsystems managed by the dynamic CHPID management (DCM) are included in the average.) Once the average is determined, a range is created. In one example, the range is, for instance, plus or minus 5% of the average value. Thereafter, the target I/O velocity of each subsystem is compared to the target range. If no target I/O velocity is specified, then the default target I/O velocity is used. As the result of the comparisons, two lists are created, STEP 1206. One of the lists includes those subsystems exceeding the target range and the other includes those subsystems missing the range. In each case, subsystems which have been modified recently (e.g., within the last 10 seconds) are excluded from the lists.

Thereafter, the list of missing targets is sorted, STEP 1208. In one example, WLM is used to sort this list, since WLM is in the position to determine which subsystems are most important. Thus, WLM orders the subsystems in the order in which WLM would like them serviced.

Subsequent to sorting the list, one or more of the subsystems on the list are serviced by, for instance, shifting capacity from the under-utilized subsystems to the over-utilized subsystems, STEP 1210. As many of the subsystems that can be serviced in the allotted time are adjusted.

Figure 13B:
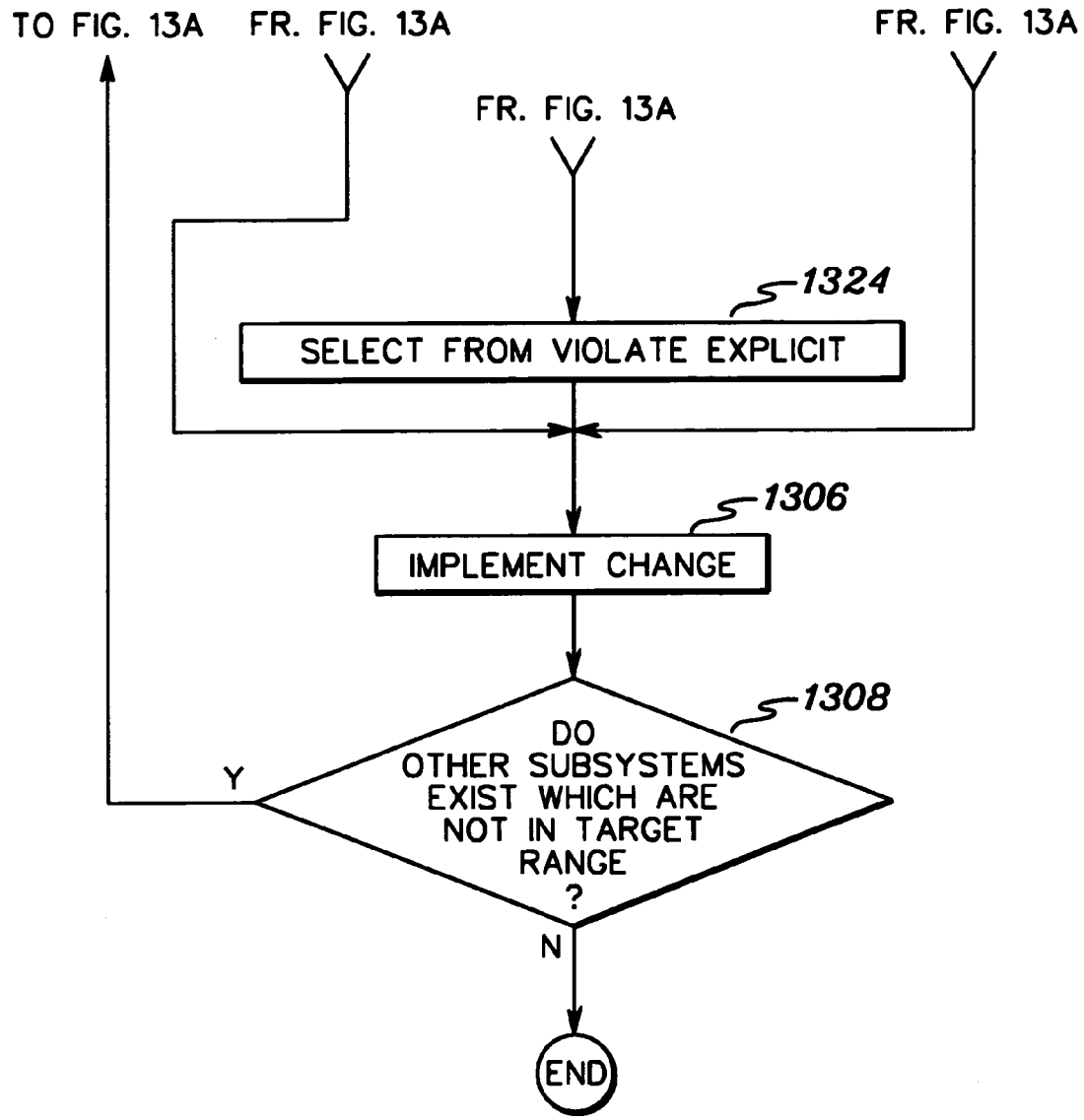

One embodiment of the logic associated with adjusting the capacity is described with reference to FIGS. 13a–13b. Initially, a subsystem is selected from the list, STEP 1300 (FIG. 13a). In one example, it is the first subsystem on the list that is selected. Thereafter, a determination is made as to whether it is the destination port busy that is the problem, INQUIRY 1302. In particular, a determination is made as to whether the contention (e.g., destination port busy time) is high, and if it is, does it vary with respect to the various interfaces that connect thereto. If the destination port busy is high on all of the interfaces, then it signifies that another channel path needs to be added. However, if it is high on only one interface, then a channel path is moved to another interface, STEP 1304. Thus, an existing path is moved from the interface with excessive destination port busy time to another interface, and processing continues with implementing the change, STEP 1306 (FIG. 13b).

Examples of how to implement the change are described in U.S. Pat. No. 5,257,379, entitled "Establishing Synchronization Of Hardware And Software I/O Configuration Definitions," issued October 1993; U.S. Pat. No. 5,257,368, entitled "Method And Apparatus For Dynamic Changes To System I/O Configuration," issued October 1993; and U.S. Pat. No. 5,220,654, entitled "Method And System For Managing An Operating System Definition Of A Dynamically Modifiable I/O Configuration," issued June 1993, each of which is hereby incorporated herein by reference in its entirety.

After the change is implemented, a determination is made as to whether there are other subsystems that are not in the target range, INQUIRY 1308. If not, then processing of the imbalance correction is complete. However, if other subsystems are not within the range, then processing continues with STEP 1300 "SELECT NEXT SUBSYSTEM IN THE LIST" (FIG. 13a).

Returning to INQUIRY 1302, if the problem is not due to contention, then processing continues, as described herein.

In particular, in one example, the possible channel paths to be added to the subsystem are determined, STEP 1310.

This determination includes checking within the physical topology all of the channels that can get to the particular subsystem, and then for each channel, determining possible ways (paths) to get to the subsystem. A path is a connectivity permutation through the hardware elements connecting and include both the channel and subsystem. All of these paths (or a subset, if so desired) are included in the possible paths.

Similarly, a determination is made as to the possible paths to remove, STEP 1312. As one example, if there are multiple subsystems on the same channel, then one of the paths connected to the sharing subsystem is considered a candidate for removal.

Thereafter, a determination is made as to which subsystems will be impacted by the change, STEP 1314. Further, an entropy index indicating the complexity of a configuration to be changed is also determined, as described below.

Figure 14:
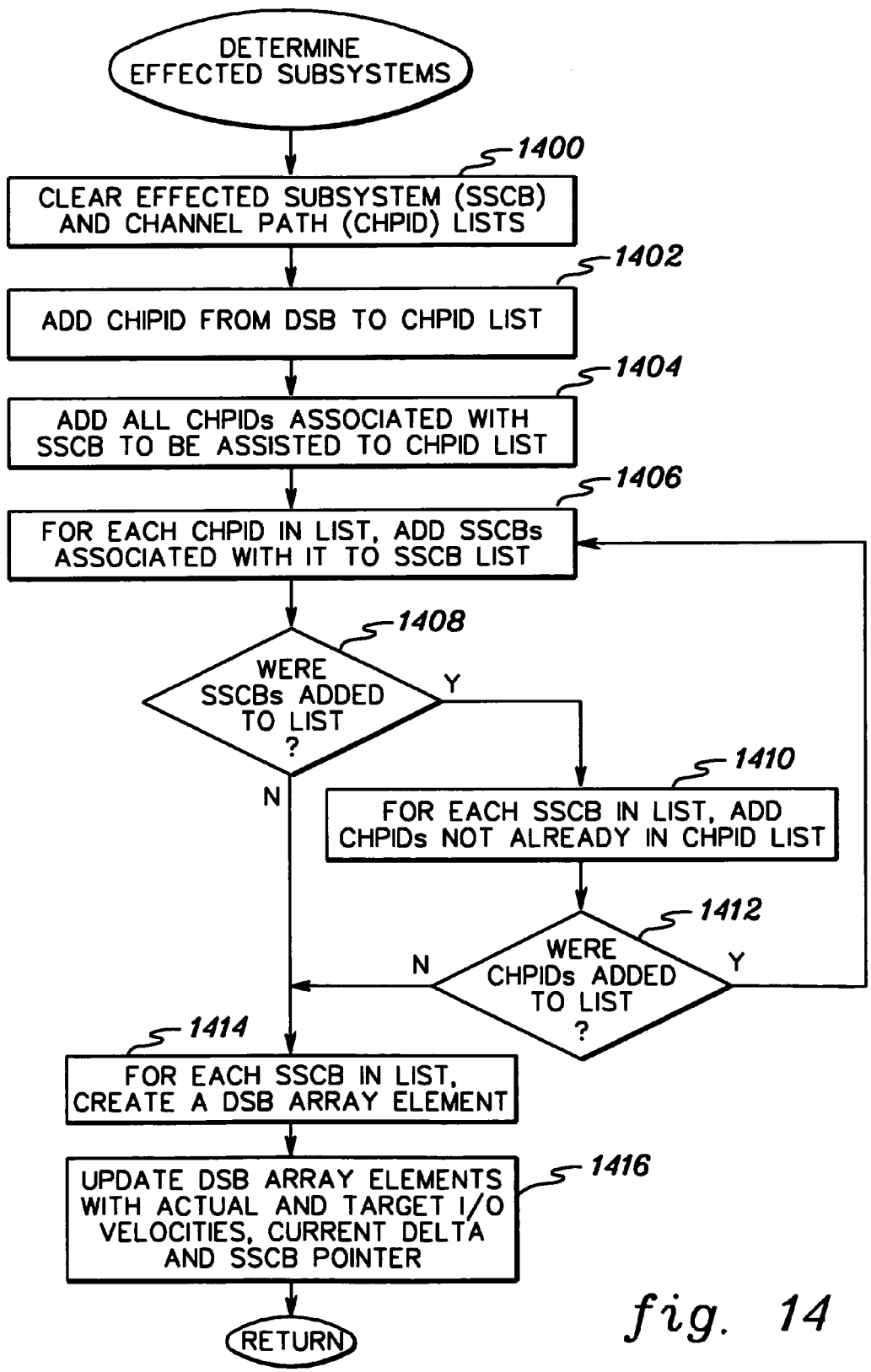
FIG. 14 depicts one embodiment of the logic associated with determining effected subsystems, in accordance with the principles of the present invention.

One embodiment of the logic associated with determining the effected subsystems is described with reference to FIG. 14. Initially, a subsystem control block (SSCB) list for subsystems and a CHPID list for channels are cleared for use later on, STEP 1400. Thereafter, a channel path id is retrieved from a decision selection block (DSB) associated with the proposed channel and is added to the CHPID list, STEP 1402. In particular, each path has a decision selection block associated therewith. The decision selection block is a control block that includes various information, including, for example, the id of the channel path (CHPID), a subsystem control block (SSCB) pointer indicating the logical control unit associated with the channel path, and an array of effected SSCBs. Each SSCB includes all of the channels connected to the subsystem.

Thereafter, all the CHPIDs associated with the SSCB to be assisted is also added to the CHPID list, STEP 1404. In particular, the SSCB pointer is retrieved from the DSB which indicates the SSCB to be assisted. All of the CHPIDs in the SSCB are then added to the CHPID list.

Thereafter, for each CHPID in the list, the SSCBs associated with the channel path are added to the SSCB list, STEP 1406. In one example, this information is obtained from a channel path table that indicates the SSCBs connected to each CHPID.

Subsequently, a determination is made as to whether any SSCBs were added to the list, INQUIRY 1408. If so, then for each SSCB in the list, the CHPIDs not already in the CHPID list are added, STEP 1410, as described above with STEP 1404.

Thereafter, a further determination is made as to whether there were any CHPIDs added to the list, INQUIRY 1412. If there were more CHPIDs added to the list, then processing continues with STEP 1406. However, if there are no SSCBs or CHPIDs added to the lists, INQUIRIES 1408, 1412, then for each SSCB in the list, a DSB array element is created, STEP 1414. That is, each of the SSCBs are added to the array of effected SSCBs. Additionally, each of the array elements is updated with actual and target I/O velocities, the current delta between the target and actual I/O velocities, and an SSCB pointer, STEP 1416.

Returning to FIG. 13*a*, in addition to the above, the availability index for each path is calculated, STEP 1316. In one example, the availability index is a number that indicates how many single points of failure the proposed path has in common with existing paths to the subsystem. If a channel path is to be added, then it is desired to have no single points of failure. If a channel path is to be deleted, then the path with the most single points of failure is typically chosen.

Subsequently, the impact to the effected systems is projected, STEP 1318. In particular, in one example, the current load on each subsystem is looked at to determine how it will be different if the change is made. Using this information, the best option is selected, STEP 1320. In order to select the best option, various factors may be considered including, for instance, the following:

Which option moves the subsystem closest to target?
Which option provides the best availability?
Which option provides the best symmetry (least entropy)?
Will this option reduce the total number of paths below two?
Will this option violate any explicit targets (WLM can provide explicit targets to be used instead of the default targets)?
Will this option violate any architectural limits?
Will this option violate the configuration as defined by the installation?
Will this option attempt to use resources which are currently unavailable?

In one particular example, initially, any decision selection blocks (DSBs) that cannot be implemented under any circumstances are eliminated. This would include, for example, those that violate architectural limits, those that reduce the total number of paths below two, those that violate the configuration as defined by the installation (e.g., uses more than the maximum number of floating channel paths allowed in the definition) and those that attempt to use resources which are currently unavailable (e.g., those that attempt to use ports which were made unavailable.) (This function could be moved earlier in the processing, so that the availability index and projected impact to subsystems is not calculated for DSBs which could never be selected.)

If there is currently only one path to the subsystem (possible shortly after system startup or after a failure), select a path with the best availability index. If more than one have equivalent availability indices, select the path that has the lowest entropy index that will move the target subsystem within the target I/O velocity target. If there are more than one, select the one whose total projected delta ("E Projected Delta" from the DSB) is smallest.

If there is currently more than one path to the subsystem, find the set of DSBs with the best availability index. Search that set for options which get the target subsystem within the tolerance of the target I/O velocity and have the lowest entropy index. If there are more than one, select the one who's total projected delta ("ΣProjected Delta" from the DSB) is smallest.

If there is no such option, find the set of paths with the next best availability index, and try again.

If no options get the subsystem within the tolerance, select the one that gets the subsystem closest to target, without regard for its availability index or entropy index. (The above described technique for selecting the best option is only one example. Various additions, deletions and modifications can be made without departing from the spirit of the present invention. Further, any other techniques may be used to select the best option.)

After attempting to select the best option, a determination is made as to whether the new target can be achieved without impacting subsystems with explicit targets, INQUIRY 1322. In other words, is the best option going to negatively impact the subsystems with explicit targets that were set by WLM. If so, then workload manager is invoked to choose the appropriate path, STEP 1324. Specifically, workload manager picks the path and selects new targets for the donor.

Subsequently, or if the new target can be achieved without negatively impacting subsystems with explicit targets, the change is implemented, STEP 1306, and processing continues with a determination as to whether other subsystems exist which are not in target range, INQUIRY 1308.

Figure 15:
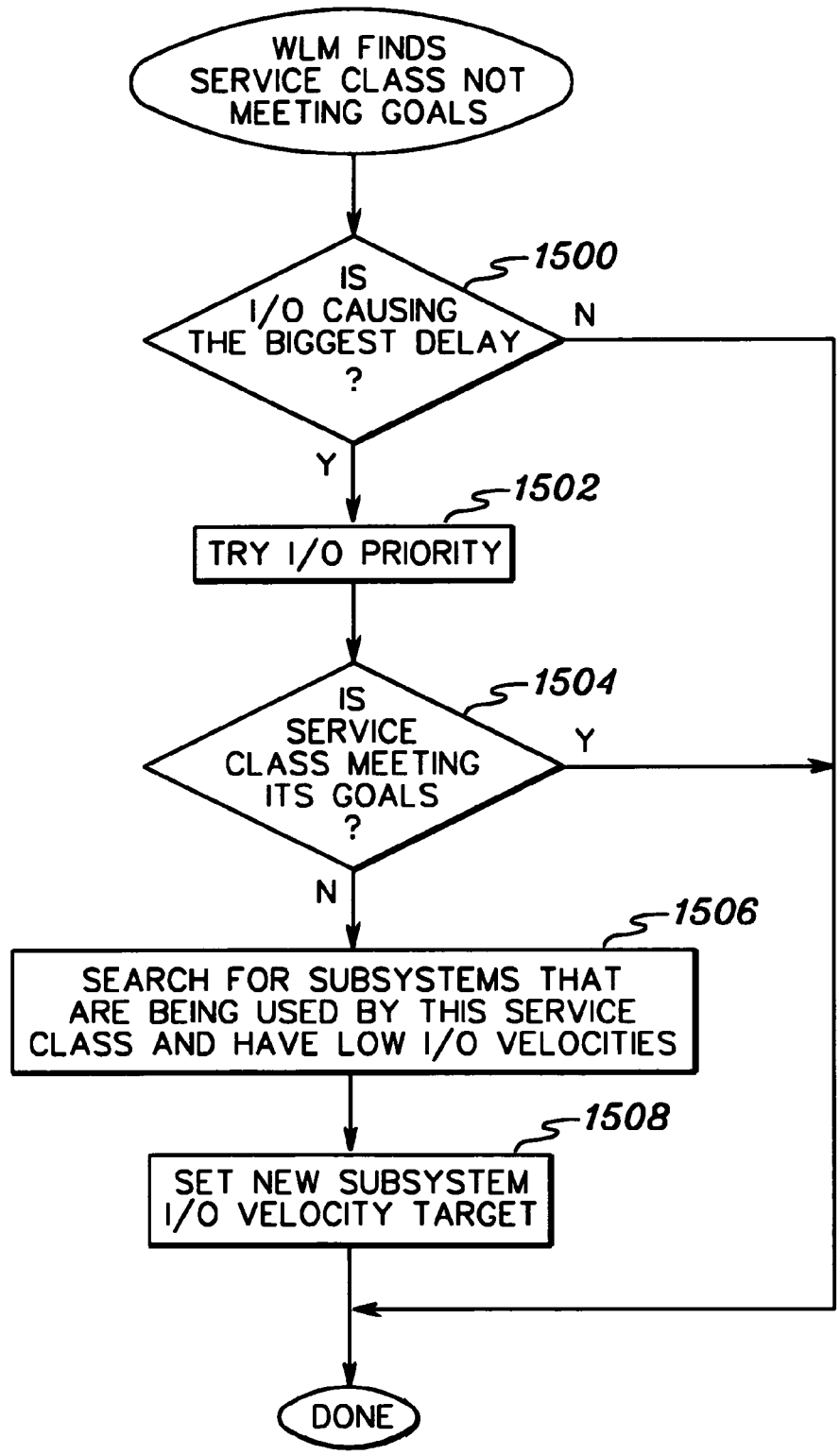
FIG. 15 depicts one embodiment of the logic associated with setting an explicit I/O velocity target used in accordance with the principles of the present invention.

As stated above, WLM can set an explicit I/O velocity target, which is to be used instead of the default average I/O velocity target. In one embodiment, WLM sets an explicit target, when WLM finds that the service class is not meeting its goals. One embodiment of the logic associated with setting the explicit subsystem I/O velocity target is described with reference to FIG. 15.

Initially, a determination is made as to whether I/O is causing the biggest delay, INQUIRY 1500. If not, then for purposes of this aspect of the invention processing is complete. However, if I/O is causing the biggest delay, then I/O priority adjustment is attempted, STEP 1502. Thereafter, a determination is made as to whether the service class is meeting its goals, INQUIRY 1504. If the service class is now meeting its goals, then processing is complete. However, if the service class is still not meeting its goals, then a search is made for subsystems that are being used by the service class and have a low I/O velocity, STEP 1506. For one or more subsystems that are located, new subsystem I/O velocity targets are set. In one example, it is set by increasing the current target by a defined amount and then projecting the impact on the subsystem. If the impact is sufficient, (e.g., above a receiver value), then processing is complete. If not, the target is increased again, and the processing is repeated.

Described in detail above is dynamic CHPID management (DCM) that provides for dynamic adjustment of I/O configurations. DCM is advantageously integrated with WLM, which enables decisions to be made with an understanding of workloads and goals. Further, DCM allows management of channels across multiple partitions (e.g., of a group of partitions). This enables the addition of resources where they are needed, as well as the removal of excess resources.

As described above, with dynamic CHPID management (DCM), the "best" channel is selected to add to (or remove from) a subsystem. In order to do this, one or more attributes are examined, including, for instance, the complexity (or entropy) of the resulting I/O configuration.

Increased entropy causes the I/O configuration to become overly complicated, resulting in excessive time in DCM's processing, inaccurate results due to excessive numbers of subsystems being impacted, complexity in performance reporting and complexity in problem determination. Thus, in one aspect of the present invention, a capability is provided to determine the relative entropy of different choices, so that the relative entropy can be considered along with other considerations, such as I/O velocity and availability, when making a choice in how a configuration is to be adjusted.

In determining relative entropy, an entropy index is calculated. For example, in the case where a path is being added, the entropy index is the sum of channels and subsystems in the resulting configuration. Further, in the case where a path is being deleted, the entropy index reflects the set of channels and subsystems interconnected to the target subsystem after the path is deleted. It does not include channels and subsystems that will no longer be in the set.

To calculate the degree of entropy for each option, the number of channels and subsystems that are connected together, assuming the decision is implemented, is used. One basic premise of the entropy technique is to calculate an index which enables a comparison of two or more proposed topologies and a determination of which one is more symmetric, or has less entropy. The purpose of this is to avoid large interconnected topologies, which are suspected will make the I/O velocity technique less accurate, and will make it harder for people to analyze performance problems after the fact, due to overly complex topologies.

Figure 16A:
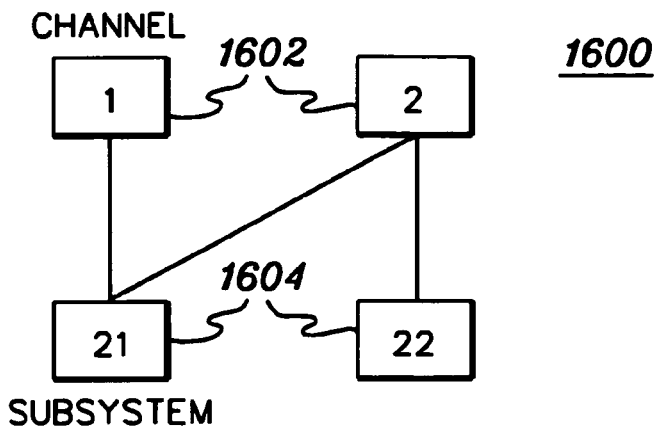
Figure 16B:
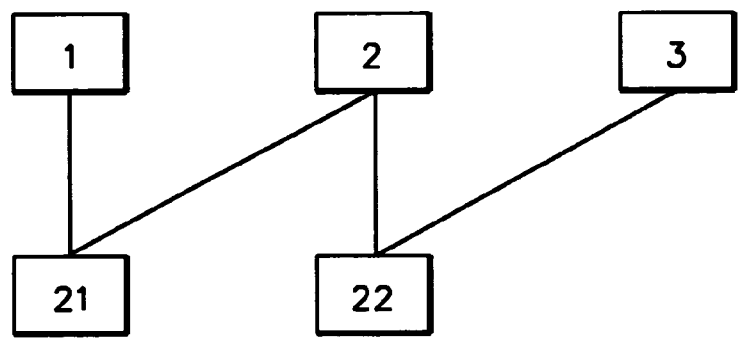
Figure 16C:
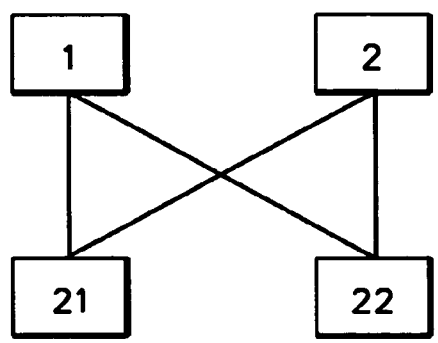

One embodiment of the entropy determination technique is described with reference to various examples. For instance, FIG. 16*a* depicts one example of a configuration 1600 that includes two channels 1602 connected to two subsystems 1604. If subsystem 22 needs additional resource, it can obtain it from at least two places. It can either receive it from channel 1 or channel 3. If it obtains it from channel 3, the resulting configuration now has three channels and two subsystems (FIG. 16*b*). This gives the configuration an entropy index of five (3+2). If, however, subsystem 22 receives additional resource from channel 1 (FIG. 16*c*), the resulting configuration has no more channels or subsystems than it originally had, and the resulting entropy index is two. In this example, the second option has the least entropy.

Figure 17A:
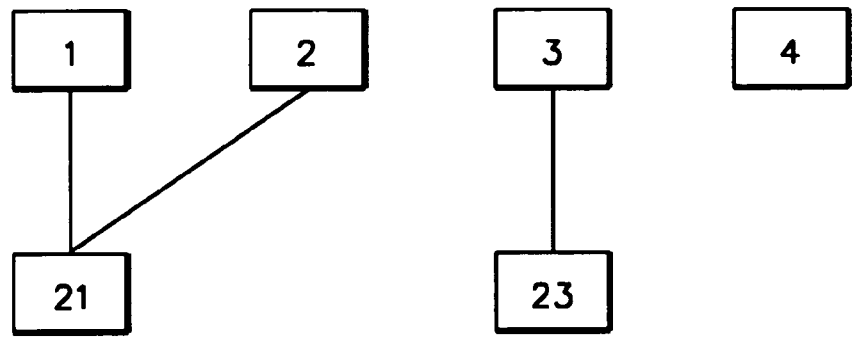
Figure 17B:
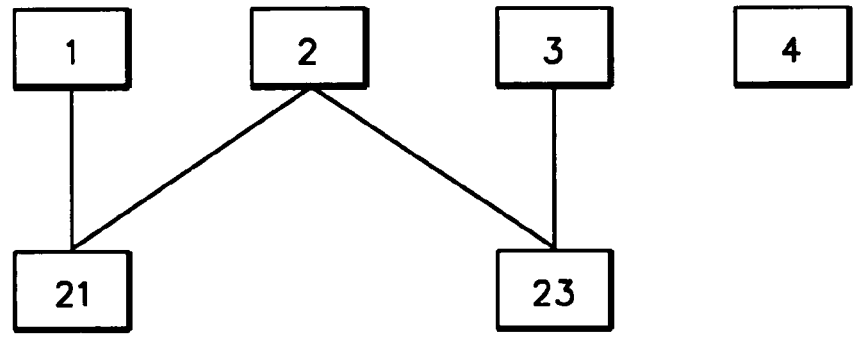
Figure 17C:
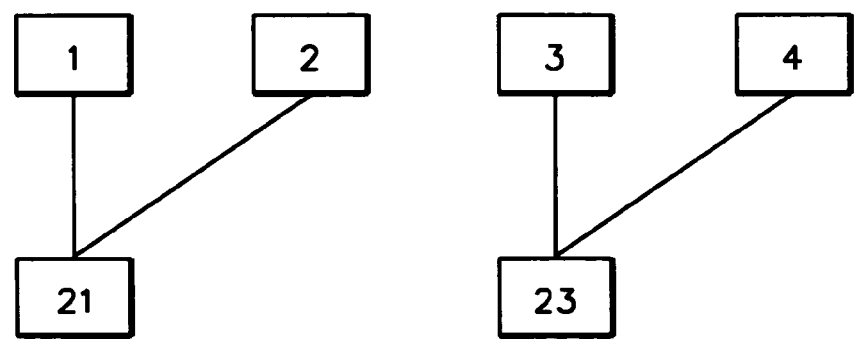

Consider another example. In the example depicted in FIG. 17*a*, subsystem 23 needs additional resource. It can be obtained from channel 2 or 4. If channel 2 is used, (FIG. 17*b*) the resulting entropy index is five (i.e., three channels interconnected to two subsystems in one configuration; channel 4 is not counted, since it is not connected.) If channel 4 is used (FIG. 17*c*), the resulting index is three. Thus, the second option has the least entropy.

Next, consider cases where the configuration is split, to determine how this effects entropy.

Figure 18A:
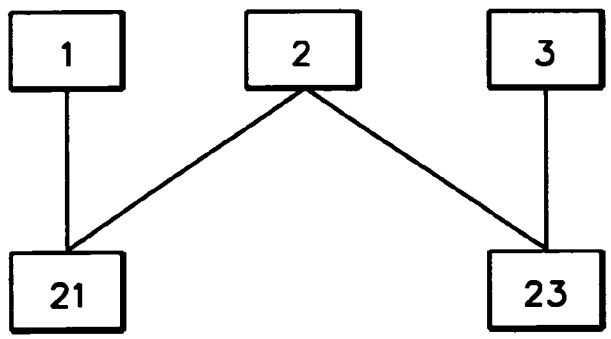
Figure 18B:
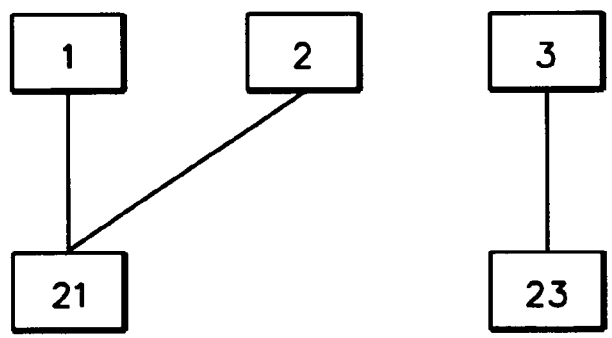
Figure 18C:
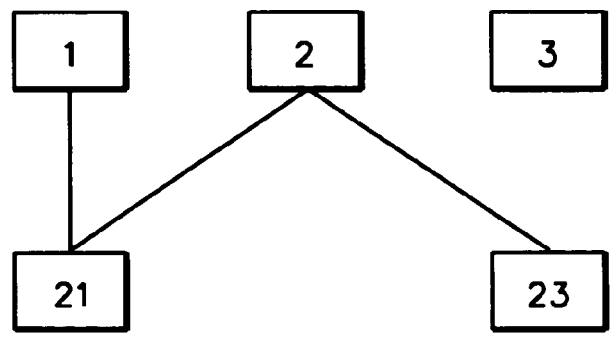

Referring to FIG. 18*a*, if subsystem 23 has excess capacity, channel 2 or 3 could be removed. If channel 2 is removed (FIG. 18*b*), the configuration is split, and the entropy index of both configurations goes down. If channel 3 is removed (FIG. 18*c*), there is still one configuration, but with a lower entropy index than the original index. It appears that the decision that breaks the configuration, somewhat in half, results in two less complicated networks, and is the better choice, in one embodiment.

Figure 19A:
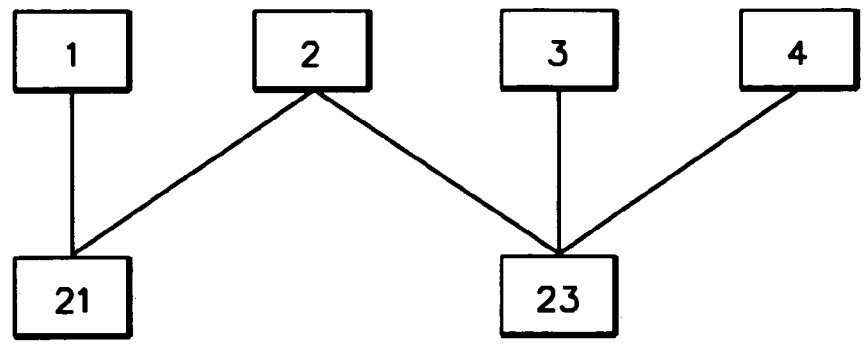
Figure 19B:
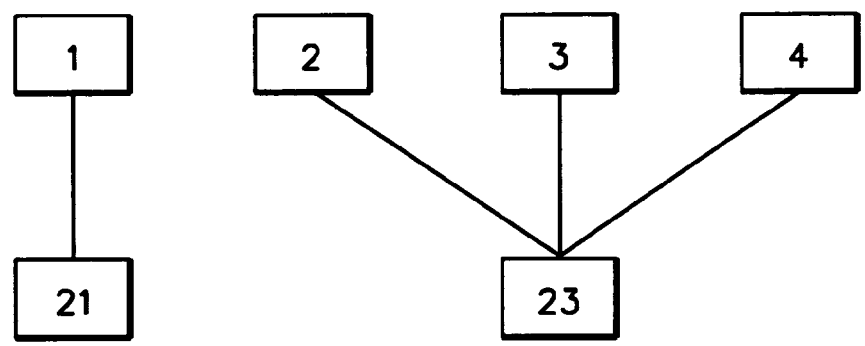
Figure 19C:
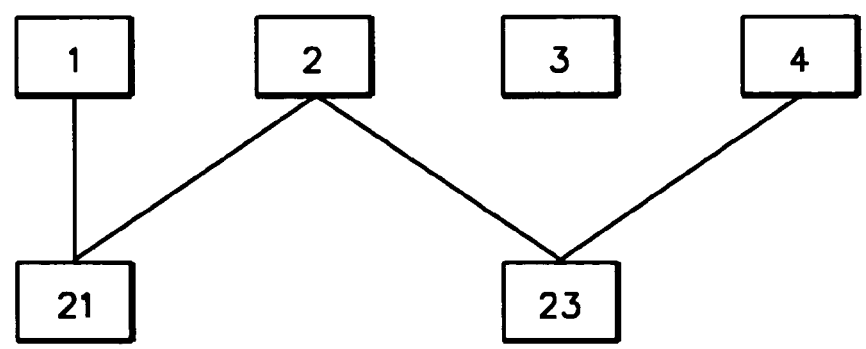

On a delete, if the index of the existing configuration (FIG. 19*a*) is known, as well as the index of the proposed configuration containing the subsystem at hand (right side of FIG. 19*b*), the index of the other configuration (left side of FIG. 19*b*) can be calculated by subtracting. In this example, the index of the other configuration is equal to 2 (4−3=1 and 2−1=1, so 1+1=2). If the subtraction results in a zero for the number of subsystems or channels, as in FIG. 19*c*, then entropy has been reduced without splitting the configuration. (E.g., 2 subsystems-2 subsystems=0.) Splitting is preferred, in one embodiment.

Figure 20A:
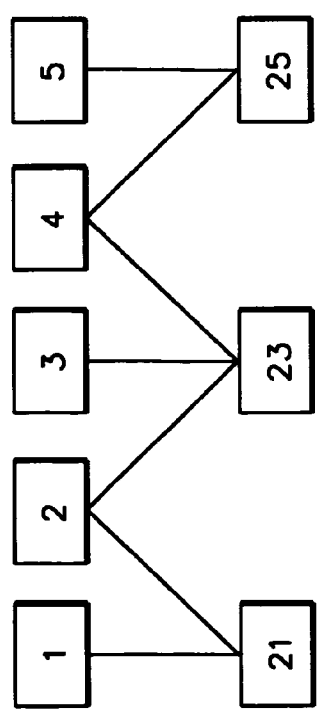
Figure 20B:
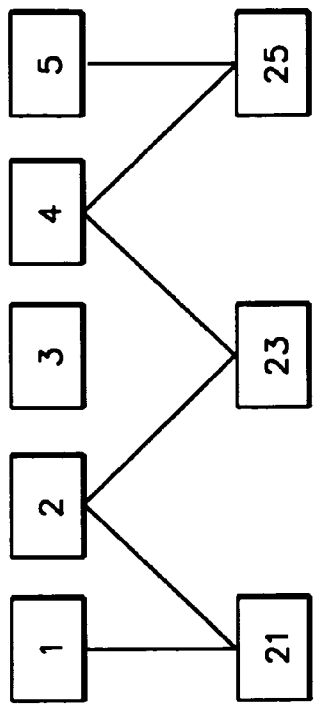
Figure 20C:
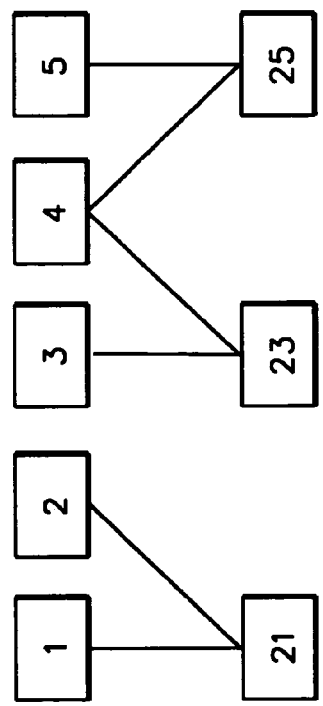

In the following example, subsystem 23 has excess resource (FIG. 20*a*). Channels 2 or 3 can be removed. If channel 3 is removed (FIG. 20*b*), the resulting entropy index is 7. If channel 2 is removed (FIG. 20*c*), the configuration is split into two configurations with the configuration at hand (configuration with subsystem 23) having an entropy index of 5 and the resulting second configuration having an entropy index at 3. In one embodiment, splitting the configuration is preferred.

Further examples are now considered to determine if it is only desired on a delete to look for a split, not the resulting entropy value.

In the example depicted in FIG. 21*a*, subsystem 23 has too much bandwidth. Either channel 2 or 4 can be removed. If channel 2 is removed (FIG. 21*b*), a new entropy index of 6 is obtained, with the resulting second configuration's entropy index at 3. If channel 4 is removed (FIG. 21*c*), a new entropy index of 5 is obtained, with the resulting second configuration's entropy index at 4. The configuration with entropy indices of 5 and 4 is the better choice. So the type of split does matter, in one embodiment.

In the example depicted in FIG. 22a, subsystem 23 needs additional resource. Subsystem 21 can be removed from channel 2 (FIG. 22b), giving subsystem 23 all of channel 2's resource; or subsystem 25 can be removed from channel 4 (FIG. 22c), giving 23 all of channel 4's resource.

If subsystem 21 is removed from channel 2, the resulting entropy index is 7, and that of the resulting second configuration is 2. If subsystem 25 is removed from channel 4, the resulting entropy index is now 6, and the resulting second configuration is 3. The second choice seems better, in one embodiment, because the split is closer to being even.

In order to calculate which option is closer to being in half (i.e., "even"), determine the difference in the number of channels and subsystems between the new entropy index and that of the resulting second configuration. In this example, the first choice results in entropy indices of 7 and 2, so the difference is 5 (i.e., the symmetry index). The second choice results in entropy indices of 6 and 3, so the difference is 3. The one with the lower difference is the best choice in this embodiment.

To conclude, in one embodiment, options which do not move the subsystem closer to the target I/O velocity are to be eliminated. Further, the entropy index is calculated by adding the total number of channels and subsystems that are interconnected in the resulting configuration. If the entropy index does not change, the change is symmetric. The configuration with the lowest entropy index is typically selected. Avoid selecting a configuration with greater than eight channels, even if it means selecting one with a higher entropy index. If there is no alternative, select a configuration with greater than eight channels, and hopefully on the next interval the configuration will be split.

Although variations of the above embodiments are described with reference to I/O configurations, the capabilities of the present invention are equally applicable to other networks, such as storage area networks, as well as others.

Described above are various mechanisms for managing resources of a computing environment. In one aspect of the invention, physical shareable resources are managed across logical partitions of a computing environment. Further, in one embodiment, the logical partitions are grouped to enable resource sharing through, for instance, priority based resource allocations. This resource sharing includes, for example, dynamic management of CPU resources across LPARs; dynamic CHPID management across LPARs; I/O priority queueing in the channel subsystem; and dynamic management of memory across LPARs.

In one example, the workload manager of the system is at least partially responsible for this management. The shareable resources are dynamically redistributed across the LPARs under workload manager direction transparent to the application's subsystems. The resources are provided to the needed partitions based on monitoring activity and customers' goals. Additionally, the dynamic adjustment of physical resources in accordance with workload goals via, for instance, WLM, sysplex and PR/SM integration, is performed without needing parallel sysplex data sharing.

In the embodiments described above, various computing environments and systems are described. These are only examples and are not intended to limit the various aspects of the present invention. Further, various aspects of the present invention are described with reference to logical partitions. The use of logical partitions is only one example. Aspects of the invention will apply to other types of partitioning, as well as to non-partitioned systems. Thus, these are also considered within the scope of the present invention.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing logical processors of a computing environment, said method comprising:
    configuring a logical partition of said computing environment with one or more logical processors;
    determining that said configuration is to be adjusted, said determining comprising using a predefined equation in making the determination, the predefined equation comprising:
        L=floor[max(W,U)*P+1.5], wherein
        L=number of logical processors configured to said logical partition;
        W=percentage of central processor capacity assigned to said logical partition;
        U=percentage of central processor capacity currently being utilized by said logical partition; and
        P=number of physical processors that can be allocated on the central processor associated with said logical partition; and
    dynamically adjusting the configuration.

2. The method of claim 1, wherein said equation is subject to a maximum of L=P.

3. A system of managing logical processors of a computing environment, said system comprising:
    means for configuring a logical partition of said computing environment with one or more logical processors;
    means for determining that said configuration is to be adjusted, said means for determining comprising means for using a predefined equation in making the determination, the predefined equation comprising:
        L=floor[max(W,U)*P+1.5], wherein
        L=number of logical processors configured to said logical partition;
        W=percentage of central processor capacity assigned to said logical partition;
        U=percentage of central processor capacity currently being utilized by said logical partition; and P=number of physical processors that can be allocated on the central processor associated with said logical partition; and means for dynamically adjusting the configuration.

4. The system of claim 3, wherein said equation is subject to a maximum of L=P.

5. At least one program storage device readable by a machine, tangibly embodying at least one program of instructions executable by the machine to perform a method of managing logical processors of a computing environment, said method comprising:

configuring a logical partition of said computing environment with one or more logical processors;

determining that said configuration is to be adjusted, said determining comprising using a predefined equation in making the determination, the predefined equation comprising:

L=floor[max(W,U)*P+1.5], wherein

L=number of logical processors configured to said logical partition;

W=percentage of central processor capacity assigned to said logical partition;

U=percentage of central processor capacity currently being utilized by said logical partition; and P=number of physical processors that can be allocated on the central processor associated with said logical partition; and dynamically adjusting the configuration.

6. The at least one program storage device of claim 5, wherein said equation is subject to a maximum of L=P.

* * * * *

UNITED STATES PATENT AND TRADEMARK OFFICE
CERTIFICATE OF CORRECTION

PATENT NO.        : 6,986,137 B1
APPLICATION NO.   : 09/407594
DATED             : January 10, 2006
INVENTOR(S)       : King et al.

It is certified that error appears in the above-identified patent and that said Letters Patent is hereby corrected as shown below:

Tilte Page:

(75) Inventors:

Delete "Peter B. Yocom, Lagrangeville, NY (US)" and insert -- Peter B. Yocom, Wappingers Falls, NY (US) --

Specification:

Col. 2, line 5, delete "IBM S/3901" and insert -- IBM S/390®--

Col. 4, line 28, delete "OS/390>or" and insert -- OS/390™ or --.

Signed and Sealed this

Fifth Day of September, 2006

JON W. DUDAS
*Director of the United States Patent and Trademark Office*